US012809128B2

(12) United States Patent
Makida et al.

(10) Patent No.: US 12,809,128 B2
(45) Date of Patent: Nov. 24, 2026

(54) OPTICAL SYSTEM, OPTICAL APPARATUS, AND METHOD FOR MANUFACTURING OPTICAL SYSTEM

(71) Applicant: NIKON CORPORATION, Tokyo (JP)

(72) Inventors: Ayumu Makida, Tokyo (JP); Taeko Toshi, Tokyo (JP); Tomoki Ito, Tokyo (JP); Keigo Koida, Tokyo (JP); Miwako Yoshida, Tokyo (JP)

(73) Assignee: Nikon Corporation, Tokyo (JP)

( * ) Notice: Subject to any disclaimer, the term of this patent is extended or adjusted under 35 U.S.C. 154(b) by 292 days.

(21) Appl. No.: 18/288,820

(22) PCT Filed: May 19, 2022

(86) PCT No.: PCT/JP2022/020820
§ 371 (c)(1),
(2) Date: Oct. 29, 2023

(87) PCT Pub. No.: WO2022/244840
PCT Pub. Date: Nov. 24, 2022

(65) Prior Publication Data
US 2024/0210656 A1 Jun. 27, 2024

(30) Foreign Application Priority Data
May 20, 2021 (JP) ................................ 2021-085385

(51) Int. Cl.
*G02B 13/00* (2006.01)

(52) U.S. Cl.
CPC ....... *G02B 13/0045* (2013.01); *G02B 13/006* (2013.01)

(58) Field of Classification Search
None
See application file for complete search history.

(56) References Cited

U.S. PATENT DOCUMENTS

2009/0257125 A1* 10/2009 Take .................... G02B 13/004 359/557
2011/0001865 A1* 1/2011 Hirao ................ G02B 13/0085 348/335

(Continued)

FOREIGN PATENT DOCUMENTS

JP 559-083121 A 5/1984
JP 2017-054078 A 3/2017

OTHER PUBLICATIONS

International Search Report for International Patent Application No. PCT/JP2022/020820, Aug. 9, 2022.

(Continued)

*Primary Examiner* — Shan Liu
(74) *Attorney, Agent, or Firm* — Potomac Law Group, PLLC

(57) ABSTRACT

An optical system is configured to include, in order from an object side, a first lens group, a stop, and a rear group including at least one cemented lens, and to satisfy all of the following conditional expressions:

$$0.35 < Bf/y < 0.70$$

$$1.35 < TL/y < 1.85$$

where Bf is a back focus in air-equivalent length, and y is a maximum image height.

Further, an optical system is configured to include, in order from an object side, a first lens group, a stop, and a rear group having an air gap between a lens disposed closest to an image-plane side of one or more lenses included in the (Continued)

first lens group and the stop, and to satisfy the following conditional expression:

$$1.35 < TL/y < 1.85$$

where TL is the distance from a lens surface closest to the object side to an image plane at focusing on an object at infinity, and y is a maximum image height.

20 Claims, 23 Drawing Sheets

(56) References Cited

U.S. PATENT DOCUMENTS

| | | | | |
|---|---|---|---|---|
| 2013/0335588 | A1* | 12/2013 | Matsusaka ............. | G02B 13/18<br>359/773 |
| 2016/0011398 | A1* | 1/2016 | Tsai ....................... | G02B 13/18<br>359/714 |
| 2017/0075089 | A1* | 3/2017 | Nagami ............... | G02B 13/006 |
| 2019/0079270 | A1* | 3/2019 | Tseng ..................... | G02B 13/18 |

OTHER PUBLICATIONS

Office Action issued May 12, 2026, in Japanese Patent Application No. 2023-522716.

* cited by examiner

OPTICAL SYSTEM, OPTICAL APPARATUS, AND METHOD FOR MANUFACTURING OPTICAL SYSTEM

TECHNICAL FIELD

The present disclosure relates to an optical system, an optical apparatus, and a method for manufacturing an optical system.

BACKGROUND ART

Optical systems used in optical apparatuses, such as cameras for photographs, electronic still cameras, and video cameras, have been proposed (see, e.g., Patent Literature 1).

CITATION LIST

Patent Literature

[PTL 1]
Japanese Unexamined Patent Publication No. 2017-054078

SUMMARY OF INVENTION

An optical system of the present disclosure includes, in order from an object side, a first lens group, a stop, and a rear group; the rear group includes at least one cemented lens; all of the following conditional expressions are satisfied:

$$0.35 < Bf/y < 0.70$$

$$1.35 < TL/y < 1.85$$

where

Bf is a back focus in air-equivalent length, y is a maximum image height, and

TL is the distance from a lens surface closest to the object side to an image plane at focusing on an object at infinity.

An optical system of the present disclosure includes, in order from an object side, a first lens group, a stop, and a rear group; the optical system having an air gap between a lens disposed closest to an image-plane side of one or more lenses included in the first lens group and the stop; the following conditional expression is satisfied:

$$1.35 < TL/y < 1.85$$

where

TL is the distance from a lens surface closest to the object side to an image plane at focusing on an object at infinity, and y is a maximum image height.

A manufacturing method of the present disclosure is one for manufacturing an optical system including, in order from an object side, a first lens group, a stop, and a rear group; the method includes arranging so that the rear group includes at least one cemented lens, and that all of the following conditional expressions are satisfied:

$$0.35 < Bf/y < 0.70$$

$$1.35 < TL/y < 1.85$$

where

Bf is a back focus in air-equivalent length, and y is a maximum image height.

A manufacturing method of the present disclosure is one for manufacturing an optical system including, in order from an object side, a first lens group, a stop, and a rear group; the method includes arranging so that the optical system has an air gap between a lens disposed closest to an image-plane side of one or more lenses included in the first lens group and the stop, and wherein the following conditional expression is satisfied:

$$1.35 < TL/y < 1.85$$

where

TL is the distance from a lens surface closest to the object side to an image plane at focusing on an object at infinity, and y is a maximum image height.

DESCRIPTION OF EMBODIMENTS

Figure 1:
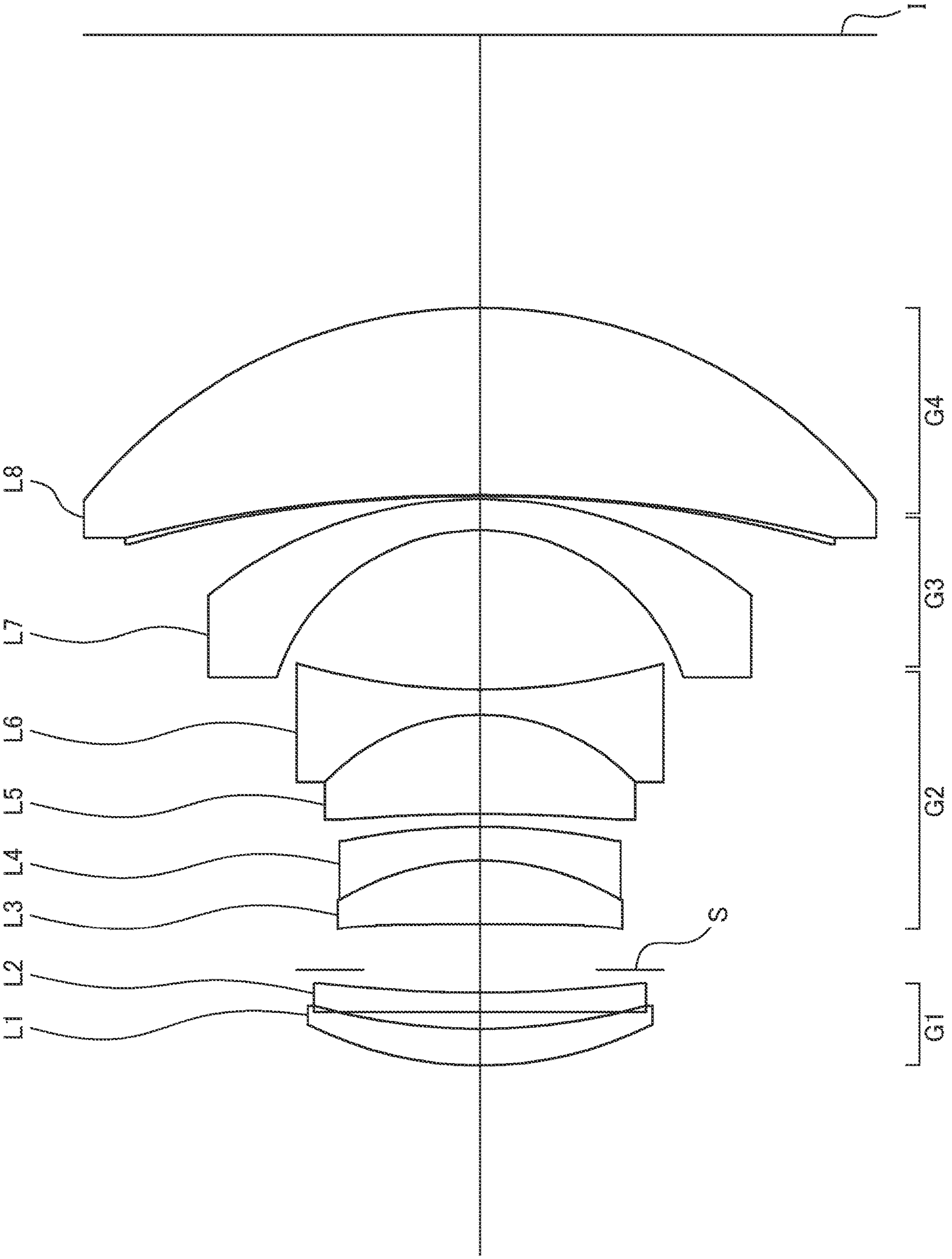
FIG. 1 is a cross-sectional view of an optical system of a first example focusing on an object at infinity.

The following describes an optical system, an optical apparatus, and a method for manufacturing an optical system of an embodiment of the present application.

An optical system of the present embodiment includes, in order from an object side, a first lens group, a stop, and a rear group; the rear group includes at least one cemented lens; all of the following conditional expressions are satisfied:

$$0.35 < Bf/y < 0.70 \quad (1)$$

$$1.35 < TL/y < 1.85 \quad (2)$$

where

Bf is a back focus in air-equivalent length, y is a maximum image height, and

TL is the distance from a lens surface closest to the object side to an image plane at focusing on an object at infinity.

The cemented lens included in the rear group enables the optical system of the present embodiment to correct chromatic aberration favorably, maintain the Petzval sum at an appropriate value, and correct curvature of field favorably.

Conditional expression (1) restricts the ratio of a back focus to a maximum image height. The optical system of the present embodiment, which satisfies conditional expression (1), enables a necessary filter or the like to be disposed between the optical system and the image plane and can correct aberrations favorably when the entire system is downsized.

If the value of conditional expression (1) is greater than the upper limit in the optical system of the present embodiment, the back focus will be large, causing aberrations when an attempt is made to shorten the total length.

The effect of the present embodiment can be ensured by setting the upper limit of conditional expression (1) to 0.70 in the optical system of the present embodiment. To further ensure the effect of the present embodiment, the upper limit of conditional expression (1) is preferably set to 0.69 or 0.55, more preferably to 0.49.

If the value of conditional expression (1) is less than the lower limit in the optical system of the present embodiment, the back focus will be too small, which makes it impossible to dispose a necessary filter or the like between the optical system and an imaging device, lowering the quality of image signals outputted from the imaging device.

The effect of the present embodiment can be ensured by setting the lower limit of conditional expression (1) to 0.35 in the optical system of the present embodiment. To further ensure the effect of the present embodiment, the lower limit of conditional expression (1) is preferably set to 0.37 or 0.40, more preferably to 0.44.

Conditional expression (2) restricts the ratio of the total optical length to a maximum image height. The optical system of the present embodiment, which satisfies conditional expression (2), can be downsized as a whole and reduce the occurrence of shading and aberrations.

If the value of conditional expression (2) is greater than the upper limit in the optical system of the present embodiment, the optical system will have a long total length and be upsized.

The effect of the present embodiment can be ensured by setting the upper limit of conditional expression (2) to 1.85 in the optical system of the present embodiment. To further ensure the effect of the present embodiment, the upper limit of conditional expression (2) is preferably set to 1.84 or 1.78, more preferably to 1.77.

If the value of conditional expression (2) is less than the lower limit in the optical system of the present embodiment, light beams will enter the imaging device at a large angle, making it difficult to reduce the occurrence of shading and aberrations.

The effect of the present embodiment can be ensured by setting the lower limit of conditional expression (2) to 1.35 in the optical system of the present embodiment. To further ensure the effect of the present embodiment, the lower limit of conditional expression (2) is preferably set to 1.38 or 1.40, more preferably to 1.45.

An optical system satisfying both conditional expressions (1) and (2) can maintain the distance from a lens surface closest to the object side to a lens surface closest to the image-plane side appropriately, and reduce aberrations while being downsized.

An optical system of the present embodiment includes, in order from an object side, a first lens group, a stop, and a rear group; the optical system has an air gap between a lens disposed closest to an image-plane side of one or more lenses included in the first lens group and the stop; the following conditional expression is satisfied:

$$1.35 < TL/y < 1.85 \quad (2)$$

where

TL is the distance from a lens surface closest to the object side to an image plane at focusing on an object at infinity, and y is a maximum image height.

Since the optical system of the present embodiment has an air gap between a lens disposed closest to an image-plane side of one or more lenses included in the first lens group and the stop, the stop is independent of the lenses, and the amount of light passing through the optical system can be varied by making the diameter of the stop variable.

Conditional expression (2) restricts the ratio of the total optical length to a maximum image height. The optical system of the present embodiment, which satisfies conditional expression (2), can be downsized as a whole and reduce the occurrence of shading and aberrations.

If the value of conditional expression (2) is greater than the upper limit in the optical system of the present embodiment, the optical system will have a long total length and be upsized.

The effect of the present embodiment can be ensured by setting the upper limit of conditional expression (2) to 1.85 in the optical system of the present embodiment. To further ensure the effect of the present embodiment, the upper limit of conditional expression (2) is preferably set to 1.84 or 1.78, more preferably to 1.77.

If the value of conditional expression (2) is less than the lower limit in the optical system of the present embodiment, light beams will enter the imaging device at a large angle, causing shading and aberrations.

The effect of the present embodiment can be ensured by setting the lower limit of conditional expression (2) to 1.35 in the optical system of the present embodiment. To further ensure the effect of the present embodiment, the lower limit of conditional expression (2) is preferably set to 1.38 or 1.40, more preferably to 1.45.

In the optical system of the present embodiment, the rear group preferably includes, in order from the object side, a second lens group, a third lens group having negative refractive power, and a fourth lens group; the third lens group preferably includes a negative meniscus lens concave on the object side that is closest to the object side in the third lens group; and the fourth lens group preferably consists of two positive lenses, a single positive lens and a single negative lens, or a single positive lens.

The optical system of the present embodiment with such a configuration can be reduced in total length and have favorable imaging performance.

In the optical system of the present embodiment, the lens closest to the object side in the third lens group is preferably a negative meniscus lens disposed closest to the object side of negative meniscus lenses concave on the object side that are disposed closer to the image-plane side than the stop.

The optical system of the present embodiment with such a configuration can have favorable imaging performance.

The optical system of the present embodiment preferably satisfies the following conditional expression:

$$0.30 < |f3/f| < 1.60 \tag{3}$$

where f3 is the focal length of the third lens group, and f is the focal length of the entire optical system.

Conditional expression (3) restricts the ratio of the focal length of the third lens group to that of the entire optical system. The optical system of the present embodiment, which satisfies conditional expression (3), can correct sagittal coma aberration and curvature of field favorably and be reduced in total length.

If the value of conditional expression (3) is greater than the upper limit in the optical system of the present embodiment, the third group will have too strong refractive power, making it difficult to correct sagittal coma aberration and curvature of field favorably.

The effect of the present embodiment can be ensured by setting the upper limit of conditional expression (3) to 1.60 in the optical system of the present embodiment. To further ensure the effect of the present embodiment, the upper limit of conditional expression (3) is preferably set to 1.30, more preferably to 1.10.

If the value of conditional expression (3) is less than the lower limit in the optical system of the present embodiment, the optical system will have a long total length, making downsizing difficult. Further, it will be difficult to position an exit pupil appropriately.

The effect of the present embodiment can be ensured by setting the lower limit of conditional expression (3) to 0.30 in the optical system of the present embodiment. To further ensure the effect of the present embodiment, the lower limit of conditional expression (3) is preferably set to 0.45, more preferably to 0.60.

The optical system of the present embodiment preferably satisfies the following conditional expression:

$$0.45 < f4/f < 1.70 \tag{4}$$

where f4 is the focal length of the fourth lens group, and f is the focal length of the entire optical system.

Conditional expression (4) restricts the ratio of the focal length of the fourth lens group to that of the entire optical system. The optical system of the present embodiment, which satisfies conditional expression (4), can position an exit pupil appropriately to reduce the occurrence of shading, and be reduced in total length.

If the value of conditional expression (4) is greater than the upper limit in the optical system of the present embodiment, the position of an exit pupil will be too close to the image plane, causing shading of the imaging device. Further, it will be difficult to maintain the Petzval sum at an appropriate value.

The effect of the present embodiment can be ensured by setting the upper limit of conditional expression (4) to 1.70 in the optical system of the present embodiment. To further ensure the effect of the present embodiment, the upper limit of conditional expression (4) is preferably set to 1.68 or 1.50, more preferably to 1.31.

If the value of conditional expression (4) is less than the lower limit in the optical system of the present embodiment, the optical system will have a long total length, making downsizing difficult.

The effect of the present embodiment can be ensured by setting the lower limit of conditional expression (4) to 0.45 in the optical system of the present embodiment. To further ensure the effect of the present embodiment, the lower limit of conditional expression (4) is preferably set to 0.65, more preferably to 0.81.

The optical system of the present embodiment preferably satisfies the following conditional expression:

$$0.25 < |f3/f4| < 2.00 \tag{5}$$

where f3 is the focal length of the third lens group, and f4 is the focal length of the fourth lens group.

Conditional expression (5) restricts the ratio of the focal length of the third lens group to that of the fourth lens group. The optical system of the present embodiment, which satisfies conditional expression (5), can correct curvature of field and coma aberration favorably.

If the value of conditional expression (5) is greater than the upper limit in the optical system of the present embodiment, the fourth group will have strong refractive power, making it difficult to correct curvature of field and coma aberration favorably.

The effect of the present embodiment can be ensured by setting the upper limit of conditional expression (5) to 2.00 in the optical system of the present embodiment. To further ensure the effect of the present embodiment, the upper limit of conditional expression (5) is preferably set to 1.50, more preferably to 0.95.

If the value of conditional expression (5) is less than the lower limit in the optical system of the present embodiment, the third group will have strong refractive power, making it difficult to correct curvature of field and coma aberration favorably.

The effect of the present embodiment can be ensured by setting the lower limit of conditional expression (5) to 0.25 in the optical system of the present embodiment. To further ensure the effect of the present embodiment, the lower limit of conditional expression (5) is preferably set to 0.29 or 0.35, more preferably to 0.57.

The optical system of the present embodiment preferably satisfies the following conditional expression:

$$0.50 < \Sigma D/TL < 0.97 \quad (6)$$

where

ΣD is the distance from the lens surface closest to the object side to a lens surface closest to the image-plane side.

Conditional expression (6) restricts the ratio of the distance from the lens surface closest to the object side to a lens surface closest to the image-plane side to the total length of the optical system. The optical system of the present embodiment, which satisfies conditional expression (6), facilitates disposing a filter or the like on the image-plane side of the optical system and enables a lens necessary for correcting aberrations to be disposed appropriately.

If the value of conditional expression (6) is greater than the upper limit in the optical system of the present embodiment, the back focus will be small, making it difficult to dispose a filter or the like on the image-plane side of the optical system.

The effect of the present embodiment can be ensured by setting the upper limit of conditional expression (6) to 0.97 in the optical system of the present embodiment. To further ensure the effect of the present embodiment, the upper limit of conditional expression (6) is preferably set to 0.96 or 0.85, more preferably to 0.75.

If the value of conditional expression (6) is less than the lower limit in the optical system of the present embodiment, it will be difficult to appropriately dispose a lens necessary for correcting aberrations.

The effect of the present embodiment can be ensured by setting the lower limit of conditional expression (6) to 0.50 in the optical system of the present embodiment. To further ensure the effect of the present embodiment, the lower limit of conditional expression (6) is preferably set to 0.53 or 0.60, more preferably to 0.67.

The optical system of the present embodiment preferably satisfies the following conditional expression:

$$0.050 < \Sigma D1/TL < 0.170 \quad (7)$$

where

ΣD1 is the distance from the lens surface closest to the object side to the stop.

Conditional expression (7) restricts the ratio of the distance from the lens surface closest to the object side to the stop to the total length of the optical system. The optical system of the present embodiment, which satisfies conditional expression (7), can position an exit pupil appropriately to reduce the occurrence of shading, and correct spherical aberration favorably by the entire optical system.

If the value of conditional expression (7) is greater than the upper limit in the optical system of the present embodiment, the position of an exit pupil will be too close to the image plane, making it difficult to reduce the occurrence of shading of the imaging device.

The effect of the present embodiment can be ensured by setting the upper limit of conditional expression (7) to 0.170 in the optical system of the present embodiment. To further ensure the effect of the present embodiment, the upper limit of conditional expression (7) is preferably set to 0.160 or 0.150, more preferably to 0.130.

If the value of conditional expression (7) is less than the lower limit in the optical system of the present embodiment, the first lens group will not be able to sufficiently correct aberration, making it difficult to correct spherical aberration favorably by the entire optical system.

The effect of the present embodiment can be ensured by setting the lower limit of conditional expression (7) to 0.050 in the optical system of the present embodiment. To further ensure the effect of the present embodiment, the lower limit of conditional expression (7) is preferably set to 0.055, more preferably to 0.060.

The optical system of the present embodiment preferably satisfies the following conditional expression:

$$0.75 < TL/f < 1.60 \quad (8)$$

where f is the focal length of the entire optical system.

Conditional expression (8) restricts the ratio of the total length of the optical system to the focal length of the entire optical system. The optical system of the present embodiment, which satisfies conditional expression (8), can be reduced in total length and enables lenses to be disposed appropriately to correct aberrations.

If the value of conditional expression (8) is greater than the upper limit in the optical system of the present embodiment, the optical system will have a long total length. Further, the focal length will be small as compared to the total length, and each group will have strong refractive power, making it difficult to correct coma aberration and spherical aberration favorably.

The effect of the present embodiment can be ensured by setting the upper limit of conditional expression (8) to 1.60 in the optical system of the present embodiment. To further ensure the effect of the present embodiment, the upper limit of conditional expression (8) is preferably set to 1.50, more preferably to 1.43.

If the value of conditional expression (8) is less than the lower limit in the optical system of the present embodiment, the optical system will have a short total length, making it difficult to appropriately dispose lenses for correcting aberrations. Further, the position of an exit pupil will be close to the image plane, making it difficult to reduce the occurrence of shading of the imaging device.

The effect of the present embodiment can be ensured by setting the lower limit of conditional expression (8) to 0.75 in the optical system of the present embodiment. To further ensure the effect of the present embodiment, the lower limit of conditional expression (8) is preferably set to 0.90, more preferably to 1.00.

The optical system of the present embodiment preferably satisfies the following conditional expression:

$$0.62 < TLs/TL < 1.00 \quad (9)$$

where

TLs is the distance from the stop to the image plane.

Conditional expression (9) restricts the ratio of the distance from the stop to the image plane to the total length of the optical system. The optical system of the present embodiment, which satisfies conditional expression (9), can correct spherical aberration favorably and position an exit pupil appropriately to reduce the occurrence of shading.

If the value of conditional expression (9) is greater than the upper limit in the optical system of the present embodiment, the first lens group will not be able to sufficiently correct aberration, making it difficult to correct spherical aberration favorably by the entire optical system.

The effect of the present embodiment can be ensured by setting the upper limit of conditional expression (9) to 1.00 in the optical system of the present embodiment. To further ensure the effect of the present embodiment, the upper limit of conditional expression (9) is preferably set to 0.95, more preferably to 0.94.

If the value of conditional expression (9) is less than the lower limit in the optical system of the present embodiment, the position of an exit pupil will be close to the image plane, making it difficult to reduce the occurrence of shading of the imaging device.

The effect of the present embodiment can be ensured by setting the lower limit of conditional expression (9) to 0.62 in the optical system of the present embodiment. To further ensure the effect of the present embodiment, the lower limit of conditional expression (9) is preferably set to 0.75, more preferably to 0.87.

The optical system of the present embodiment preferably satisfies the following conditional expression:

$$0.70 < f1/f < 5.00 \tag{10}$$

where f1 is the focal length of the first lens group, and f is the focal length of the entire optical system.

Conditional expression (10) restricts the ratio of the focal length of the first lens group to that of the entire optical system. The optical system of the present embodiment, which satisfies conditional expression (10), can be reduced in total length and correct axial aberration, such as spherical aberration, favorably.

If the value of conditional expression (10) is greater than the upper limit in the optical system of the present embodiment, the optical system will have a long total length.

The effect of the present embodiment can be ensured by setting the upper limit of conditional expression (10) to 5.00 in the optical system of the present embodiment. To further ensure the effect of the present embodiment, the upper limit of conditional expression (10) is preferably set to 3.50, more preferably to 2.80.

If the value of conditional expression (10) is less than the lower limit in the optical system of the present embodiment, it will be difficult for the first group to correct axial aberration, such as spherical aberration, favorably.

The effect of the present embodiment can be ensured by setting the lower limit of conditional expression (10) to 0.70 in the optical system of the present embodiment. To further ensure the effect of the present embodiment, the lower limit of conditional expression (10) is preferably set to 0.80, more preferably to 0.90.

The optical system of the present embodiment preferably satisfies the following conditional expression:

$$0.30 < f2/f < 2.00 \tag{11}$$

where f2 is the focal length of the second lens group, and f is the focal length of the entire optical system.

Conditional expression (11) restricts the ratio of the focal length of the second lens group to that of the entire optical system. The optical system of the present embodiment, which satisfies conditional expression (11), can correct curvature of field and coma aberration favorably so that coma aberration may not vary between colors.

If the value of conditional expression (11) is greater than the upper limit in the optical system of the present embodiment, the Petzval sum will not be maintained at an appropriate value, making it difficult to correct curvature of field favorably.

The effect of the present embodiment can be ensured by setting the upper limit of conditional expression (11) to 2.00 in the optical system of the present embodiment. To further ensure the effect of the present embodiment, the upper limit of conditional expression (11) is preferably set to 1.70, more preferably to 1.40.

If the value of conditional expression (11) is less than the lower limit in the optical system of the present embodiment, it will be difficult to reduce variations in coma aberration between colors.

The effect of the present embodiment can be ensured by setting the lower limit of conditional expression (11) to 0.30 in the optical system of the present embodiment. To further ensure the effect of the present embodiment, the lower limit of conditional expression (11) is preferably set to 0.45, more preferably to 0.60.

In the optical system of the present embodiment, the first lens group preferably includes one or two lenses.

The optical system of the present embodiment with such a configuration can be reduced in total length. Further, the optical system can position an exit pupil appropriately to reduce the occurrence of shading.

The optical system of the present embodiment preferably satisfies the following conditional expression:

$$0.01 < D1/TL < 0.15 \tag{12}$$

where

D1 is the distance from a lens surface closest to the object side in the first lens group to a lens surface closest to the image-plane side in the first lens group.

Conditional expression (12) restricts the ratio of the distance from a lens surface closest to the object side in the first lens group to a lens surface closest to the image-plane side in the first lens group to the total length of the optical system. The optical system of the present embodiment, which satisfies conditional expression (12), can be reduced in total length and correct spherical aberration favorably.

If the value of conditional expression (12) is greater than the upper limit in the optical system of the present embodiment, the optical system will have a long total length. Further, the position of an exit pupil will be close to the image plane, making it difficult to reduce the occurrence of shading of the imaging device.

The effect of the present embodiment can be ensured by setting the upper limit of conditional expression (12) to 0.15 in the optical system of the present embodiment. To further ensure the effect of the present embodiment, the upper limit of conditional expression (12) is preferably set to 0.13, more preferably to 0.10.

If the value of conditional expression (12) is less than the lower limit in the optical system of the present embodiment, it will be difficult to correct spherical aberration favorably.

The effect of the present embodiment can be ensured by setting the lower limit of conditional expression (12) to 0.01 in the optical system of the present embodiment. To further ensure the effect of the present embodiment, the lower limit of conditional expression (12) is preferably set to 0.015, more preferably to 0.02.

The optical system of the present embodiment preferably satisfies the following conditional expression:

$$1.50<s3<7.00 \tag{13}$$

where s3 is the shape factor of the lens closest to the object side in the third lens group.

Conditional expression (13) restricts the shape factor of the lens closest to the object side in the third lens group. The optical system of the present embodiment, which satisfies conditional expression (13), can correct astigmatism favorably and position an exit pupil appropriately to reduce the occurrence of shading.

If the value of conditional expression (13) is greater than the upper limit in the optical system of the present embodiment, it will be difficult to correct astigmatism favorably.

The effect of the present embodiment can be ensured by setting the upper limit of conditional expression (13) to 7.00 in the optical system of the present embodiment. To further ensure the effect of the present embodiment, the upper limit of conditional expression (13) is preferably set to 6.50, more preferably to 5.90.

If the value of conditional expression (13) is less than the lower limit in the optical system of the present embodiment, the position of an exit pupil will be close to the image plane, making it difficult to reduce the occurrence of shading of the imaging device.

The effect of the present embodiment can be ensured by setting the lower limit of conditional expression (13) to 1.50 in the optical system of the present embodiment. To further ensure the effect of the present embodiment, the lower limit of conditional expression (13) is preferably set to 1.60, more preferably to 1.80.

The optical system of the present embodiment preferably satisfies the following conditional expression:

$$0.15<d3/f<0.75 \tag{14}$$

where d3 is the distance from the stop to a lens surface closest to the object side in the third lens group, and f is the focal length of the entire optical system.

Conditional expression (14) restricts the ratio of the distance from the stop to a lens surface closest to the object side in the third lens group to the focal length of the entire optical system. The optical system of the present embodiment, which satisfies conditional expression (14), can correct astigmatism favorably and position an exit pupil appropriately to reduce the occurrence of shading.

If the value of conditional expression (14) is greater than the upper limit in the optical system of the present embodiment, it will be difficult to correct astigmatism favorably.

The effect of the present embodiment can be ensured by setting the upper limit of conditional expression (14) to 0.75 in the optical system of the present embodiment. To further ensure the effect of the present embodiment, the upper limit of conditional expression (14) is preferably set to 0.70, more preferably to 0.66.

If the value of conditional expression (14) is less than the lower limit in the optical system of the present embodiment, the position of an exit pupil will be close to the image plane, making it difficult to reduce the occurrence of shading of the imaging device.

The effect of the present embodiment can be ensured by setting the lower limit of conditional expression (14) to 0.15 in the optical system of the present embodiment. To further ensure the effect of the present embodiment, the lower limit of conditional expression (14) is preferably set to 0.16, more preferably to 0.17.

The optical system of the present embodiment is preferably composed of six to nine lenses.

If the number of lenses is greater than the upper limit, it will be difficult to downsize the optical system of the present embodiment. If the number of lenses is less than the lower limit, the optical system of the present embodiment will not be able to correct aberrations sufficiently.

In the optical system of the present embodiment, the object-side lens surface of the lens disposed closest to the object side preferably has positive refractive power.

The optical system of the present embodiment with such a configuration can correct spherical aberration and coma aberration favorably.

In the optical system of the present embodiment, the image-plane-side lens surface of the lens disposed closest to the image-plane side preferably has negative refractive power.

The optical system of the present embodiment with such a configuration can maintain the Petzval sum at an appropriate value and control the position of an exit pupil favorably.

In the optical system of the present embodiment, the second lens group preferably includes a cemented lens that is closest to the object side in the second lens group.

The optical system of the present embodiment with such a configuration can maintain the Petzval sum at an appropriate value and correct axial chromatic aberration favorably.

A small-sized optical system of favorable imaging performance can be achieved by the above configurations.

An optical apparatus of the present embodiment includes an optical system having a configuration described above. This enables achieving an optical apparatus of favorable optical performance.

A method for manufacturing an optical system of the present embodiment is a method for manufacturing an optical system including, in order from an object side, a first lens group, a stop, and a rear group; the method includes arranging so that the rear group includes at least one cemented lens, and that all of the following conditional expressions are satisfied:

$$0.35<Bf/y<0.70 \tag{1}$$

$$1.35<TL/y<1.80 \tag{2}$$

where

Bf is a back focus in air-equivalent length, y is a maximum image height, and

TL is the distance from a lens surface closest to the object side to an image plane at focusing on an object at infinity.

A method for manufacturing an optical system of the present embodiment is a method for manufacturing an optical system including, in order from an object side, a first lens group, a stop, and a rear group; the method includes arranging so that the optical system has an air gap between a lens disposed closest to an image-plane side of one or more lenses included in the first lens group and the stop, and that the following conditional expression is satisfied:

$$1.35 < TL/y < 1.85 \tag{2}$$

where

TL is the distance from a lens surface closest to the object side to an image plane at focusing on an object at infinity, and y is a maximum image height.

An optical system of favorable optical performance can be manufactured by such methods for manufacturing an optical system.

NUMERICAL EXAMPLES

Examples of the present application will be described below with reference to the drawings.

First Example

FIG. 1 is a cross-sectional view of an optical system of a first example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of, in order from the object side, a positive meniscus lens L1 convex on the object side and a negative meniscus lens L2 convex on the object side.

The second lens group G2 consists of, in order from the object side, a positive cemented lens composed of a positive meniscus lens L3 concave on the object side and a negative meniscus lens L4 concave on the object side as well as a negative cemented lens composed of a positive meniscus lens L5 concave on the object side and a biconcave negative lens L6.

The third lens group G3 consists of a negative meniscus lens L7 concave on the object side.

The fourth lens group G4 consists of a positive meniscus lens L8 concave on the object side. The positive meniscus lens L8 is configured by providing a resin layer on the object-side surface of a glass lens body. The positive meniscus lens L8 is a compound-type aspherical lens in which the object-side surface of the resin layer is aspherical. In the [Lens specifications] section below, surface number 14 refers to the object-side surface of the resin layer, surface number 15 to the image-side surface of the resin layer and the object-side surface of the lens body (surfaces where the resin layer and the lens body are bonded together), and surface number 16 to the image-side surface of the lens body.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 1 below shows specifications of the optical system of the present example. In the [Lens specifications] section of Table 1, m denotes the places of optical surfaces counted from the object side, r the radii of curvature, d the surface-to-surface distances, nd the refractive indices for d-line (wavelength 587.6 nm), and νd the Abbe numbers for d-line. The radius of curvature r=∞ means a plane. In the [Lens specifications] section, the optical surfaces with "*" are aspherical surfaces.

In the [Aspherical surface data] section, m denotes the optical surfaces corresponding to the aspherical surface data, K the conic constants, and A4 to A14 the aspherical coefficients.

The aspherical surfaces are expressed by expression (a) below, where y denotes the height in a direction perpendicular to the optical axis, S(y) the distance along the optical axis from the tangent plane at the vertex of an aspherical surface to the aspherical surface at height y (a sag), r the radius of curvature of a reference sphere (paraxial radius of curvature), K the conic constant, and An the nth-order aspherical coefficient. In the examples, the second-order aspherical coefficient A2 is 0. "E−n" means "×10$^{-n}$."

$$S(y) = (y^2/r)/\{1 + (1-K\times y^2/r^2)^{1/2}\} + A4\times y^4 + A6\times y^6 + A8\times y^8 + A10\times y^{10} + A12\times y^{12} + A14\times y^{14} \tag{a}$$

In the [General specifications] section of Table 1, f denotes the focal length of the optical system, F.NO the f-number of the optical system, and TL the distance from the lens surface closest to the object side to the image plane at focusing on an object at infinity.

In the [Back focus] section of Table 1, Bf denotes the back focus of the optical system in air-equivalent length.

The unit of the focal length f, the radii of curvature r, and the other lengths listed in Table 1 is "mm." However, the unit is not limited thereto because the optical performance of a proportionally enlarged or reduced optical system is the same as that of the original optical system.

The above reference symbols in Table 1 will also be used similarly in the tables of the other examples described below.

TABLE 1

[Lens specifications]

| m | r | d | nd | νd |
|---|---|---|---|---|
| 1) | 13.451 | 1.290 | 2.001000 | |
| 2) | 21.212 | 0.591 | | |
| 3) | 2035.867 | 0.700 | 1.784720 | 25.64 |
| 4) | 48.461 | 0.798 | | |

TABLE 1-continued

| | | | | |
|---|---|---|---|---|
| 5> | ∞ | 1.622 | | (aperture stop) |
| *6) | −1428.555 | 2.259 | 1.851080 | 40.12 |
| 7) | −9.490 | 1.191 | 1.784720 | 25.64 |
| 8) | −23.192 | 0.450 | | |
| 9) | −59.947 | 3.500 | 1.883000 | 40.69 |
| 10) | −7.486 | 0.900 | 1.592701 | 35.31 |
| 11) | 23.192 | 5.633 | | |
| 12) | −7.563 | 1.100 | 1.663820 | 27.35 |
| 13) | −15.314 | 0.100 | | |
| *14) | −52.504 | 0.050 | 1.560930 | 36.64 |
| 15) | −52.504 | 6.616 | 1.883000 | 40.66 |
| 16) | −17.808 | Bf | | |

[Aspherical surface data]

| m | K | A4 | A6 | A8 | A10 |
|---|---|---|---|---|---|
| 6) | 1.0000 | −2.16E−04 | 2.74E−06 | −1.55E−07 | |
| 14) | 1.0000 | −1.19E−05 | 1.34E−08 | −1.59E−11 | 3.48E−13 |

[General specifications]

| | |
|---|---|
| f | 25.75 |
| F. NO | 2.90 |
| y | 21.70 |
| TL | 36.45 |

[Focal length data of groups]

| Groups | Starting surfaces | Focal lengths |
|---|---|---|
| G1 | 1 | 67.07 |
| G2 | 6 | 25.70 |
| G3 | 12 | −23.86 |
| G4 | 14 | 28.00 |

[Back focus]

| | At focusing on infinity | At focusing on a nearby object |
|---|---|---|
| Bf | 9.650 | 14.259 |

Figure 2:
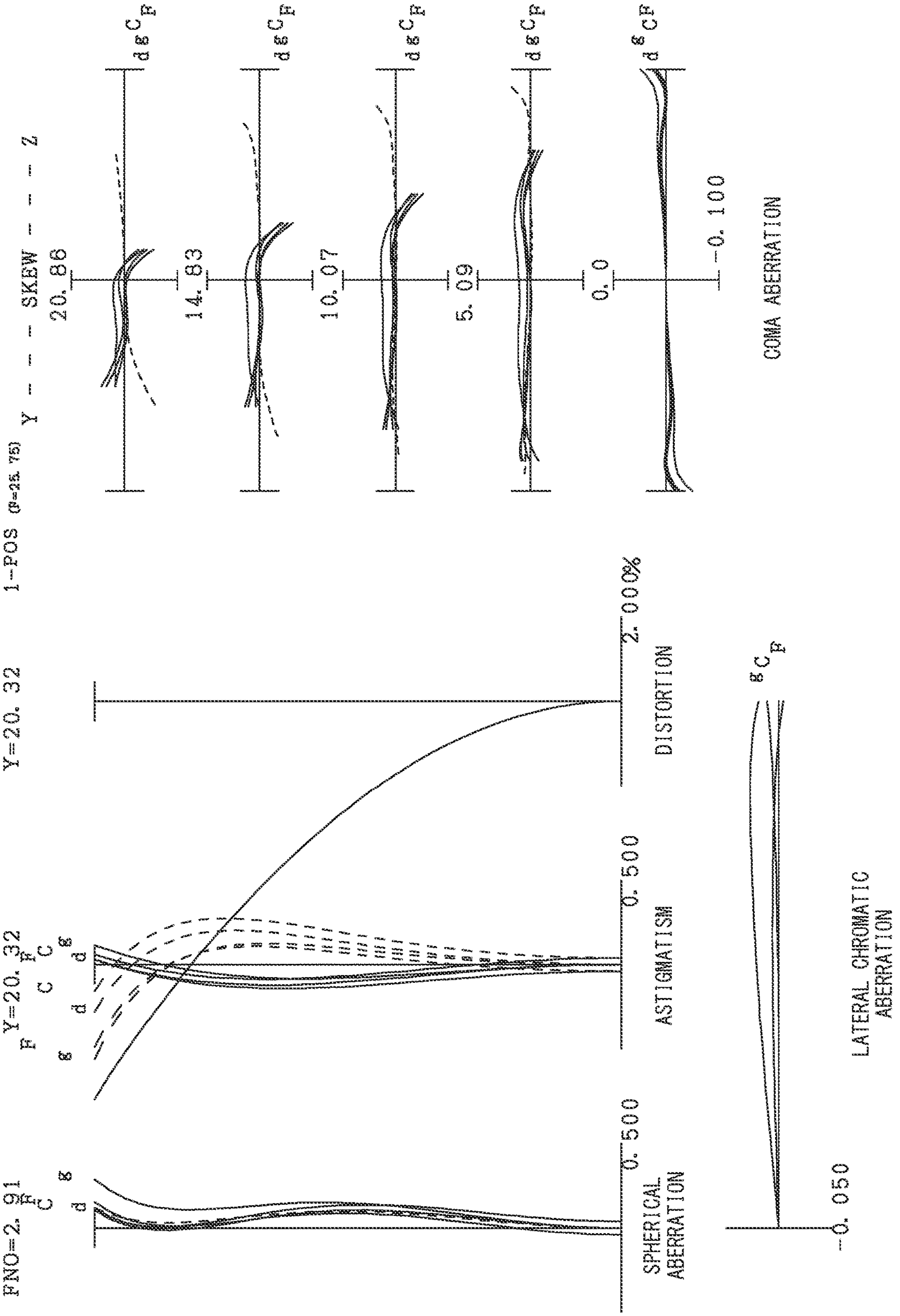
FIG. 2 shows aberrations of the optical system of the first example focusing on an object at infinity.

FIG. 2 shows aberrations of the optical system of the first example focusing on an object at infinity.

In the graphs of aberrations, FNO and Y denote f-number and image height, respectively. More specifically, the graph of spherical aberration shows the f-number corresponding to the maximum aperture, the graphs of astigmatism and distortion show the maximum of image height, and the graphs of coma aberration show the values of image height. d and g denote d-line and g-line (wavelength 435.8 nm), respectively. In the graph of astigmatism, the solid lines and the broken lines show a sagittal plane and a meridional plane, respectively. The reference symbols in the graphs of aberrations of the present example will also be used in those of the other examples described below.

The graphs of aberrations suggest that the optical system of the present example effectively reduces variations in aberrations at focusing and at varying magnification and has high optical performance.

Second Example

Figure 3:
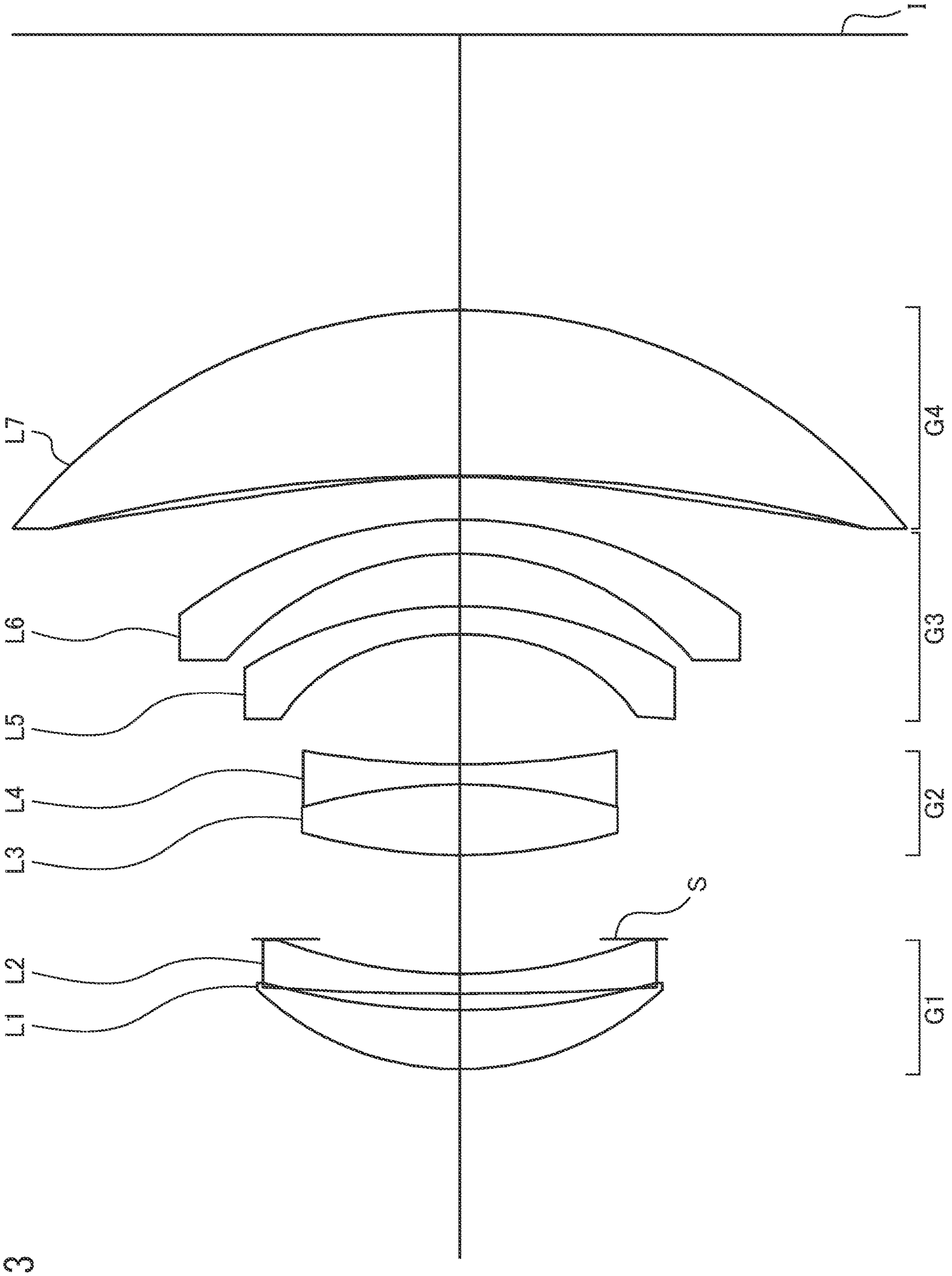
FIG. 3 is a cross-sectional view of an optical system of a second example focusing on an object at infinity.

FIG. 3 is a cross-sectional view of an optical system of a second example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of, in order from the object side, a positive meniscus lens L1 convex on the object side and a negative meniscus lens L2 convex on the object side.

The second lens group G2 consists of a positive cemented lens composed of, in order from the object side, a biconvex positive lens L3 and a biconcave negative lens L4.

The third lens group G3 consists of, in order from the object side, a negative meniscus lens L5 concave on the object side and a negative meniscus lens L6 concave on the object side.

The fourth lens group G4 consists of a positive meniscus lens L7 concave on the object side. The positive meniscus lens L7 is configured by providing a resin layer on the object-side surface of a glass lens body. The positive meniscus lens L7 is a compound-type aspherical lens in which the object-side surface of the resin layer is aspherical. In the [Lens specifications] section below, surface number 13 refers to the object-side surface of the resin layer, surface number 14 to the image-side surface of the resin layer and the object-side surface of the lens body (surfaces where the resin layer and the lens body are bonded together), and surface number 15 to the image-side surface of the lens body.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 2 below shows specifications of the optical system of the present example.

TABLE 2

[Lens specifications]

| m | r | d | nd | νd |
|---|---|---|---|---|
| 1) | 10.523 | 2.083 | 1.788139 | 48.45 |
| 2) | 25.293 | 0.594 | | |
| 3) | 107.706 | 0.700 | 1.592700 | 35.27 |
| 4) | 18.009 | 1.240 | | |
| 5> | ∞ | 2.974 | | (aperture stop) |
| 6) | 19.914 | 2.509 | 1.883000 | 40.69 |
| 7) | −19.912 | 0.700 | 1.784720 | 25.64 |
| 8) | 30.951 | 4.628 | | |
| *9) | −10.138 | 1.000 | 1.806100 | 40.73 |
| 10) | −14.290 | 1.852 | | |

TABLE 2-continued

| | | | | |
|---|---|---|---|---|
| 11) | −10.931 | 1.200 | 1.517420 | 52.20 |
| 12) | −16.313 | 1.511 | | |
| *13) | −30.550 | 0.050 | 1.560930 | 36.64 |
| 14) | −57.089 | 5.874 | 1.883000 | 40.66 |
| 15) | −20.049 | Bf | | |

[Aspherical surface data]

| m | K | A4 | A6 | A8 | A10 | A12 |
|---|---|---|---|---|---|---|
| 9) | 1.0000 | −2.97E−04 | 3.54E−06 | −3.66E−07 | 7.73E−09 | −1.01E−10 |
| 13) | 1.0000 | 8.18E−05 | −2.53E−07 | 2.83E−10 | | |

[General specifications]

| | |
|---|---|
| f | 32.80 |
| F. NO | 2.90 |
| y | 21.70 |
| TL | 36.67 |

[Focal length data of groups]

| Groups | Starting surfaces | Focal lengths |
|---|---|---|
| G1 | 1 | 43.59 |
| G2 | 6 | 39.04 |
| G3 | 9 | −28.00 |
| G4 | 13 | 42.81 |

[Back focus]

| | At focusing on infinity | At focusing on a nearby object |
|---|---|---|
| Bf | 9.756 | 17.988 |

Figure 4:
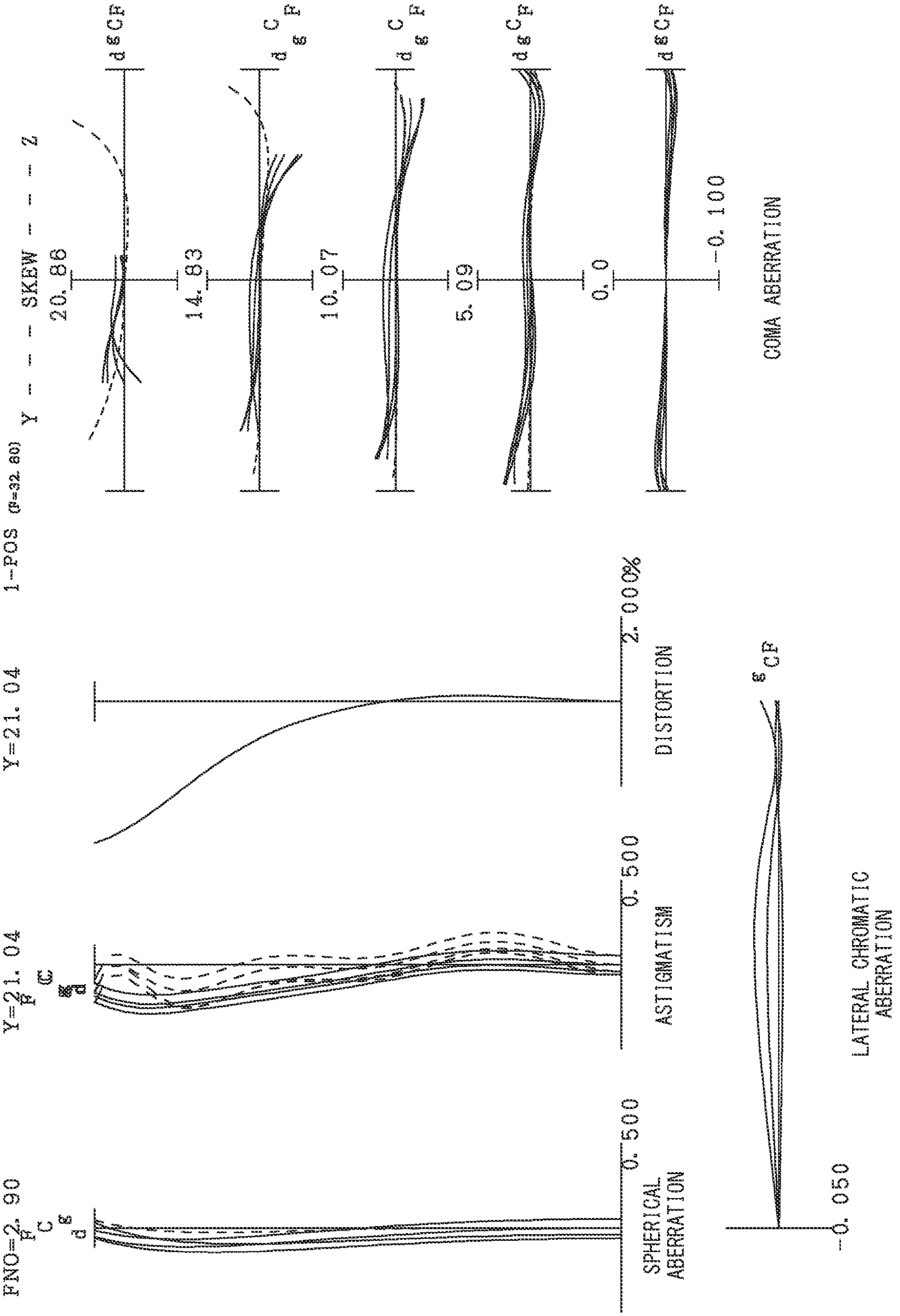
FIG. 4 shows aberrations of the optical system of the second example focusing on an object at infinity.

FIG. 4 shows aberrations of the optical system of the second example focusing on an object at infinity.

The graphs of aberrations suggest that the optical system of the present example effectively reduces variations in aberrations at focusing and at varying magnification, and has high optical performance.

Third Example

Figure 5:
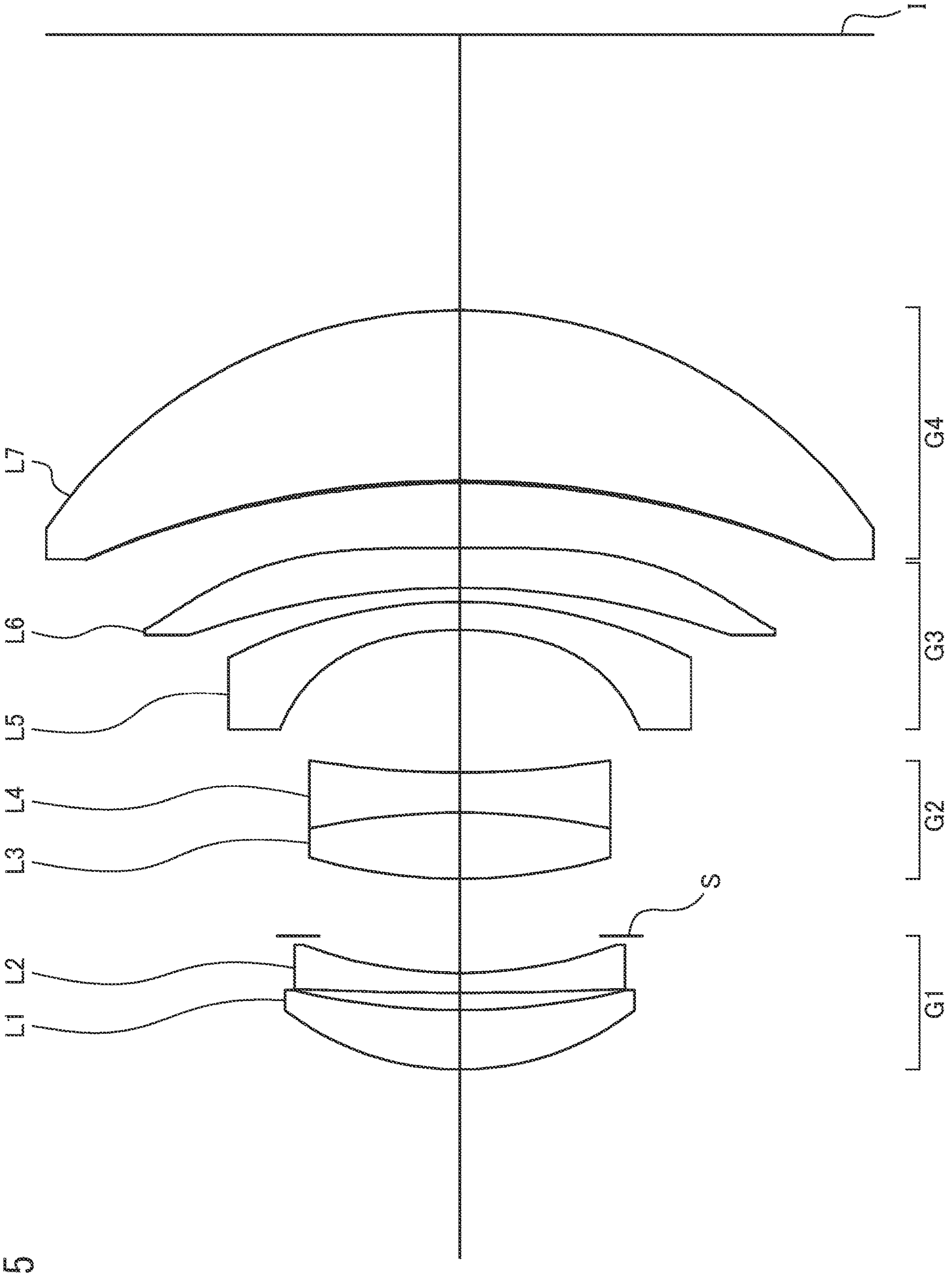
FIG. 5 is a cross-sectional view of an optical system of a third example focusing on an object at infinity.

FIG. 5 is a cross-sectional view of an optical system of a third example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of, in order from the object side, a positive meniscus lens L1 convex on the object side and a negative meniscus lens L2 convex on the object side.

The second lens group G2 consists of a positive cemented lens composed of, in order from the object side, a biconvex positive lens L3 and a biconcave negative lens L4.

The third lens group G3 consists of, in order from the object side, a negative meniscus lens L5 concave on the object side and a biconcave negative lens L6.

The fourth lens group G4 consists of a positive meniscus lens L8 concave on the object side. The positive meniscus lens L8 is configured by providing a resin layer on the object-side surface of a glass lens body. The positive meniscus lens L8 is a compound-type aspherical lens in which the object-side surface of the resin layer is aspherical. In the [Lens specifications] section below, surface number 13 refers to the object-side surface of the resin layer, surface number 14 to the image-side surface of the resin layer and the object-side surface of the lens body (surfaces where the resin layer and the lens body are bonded together), and surface number 15 to the image-side surface of the lens body.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 3 below shows specifications of the optical system of the present example.

TABLE 3

[Lens specifications]

| m | r | d | nd | vd |
|---|---|---|---|---|
| 1) | 10.192 | 2.106 | 1.772500 | 49.62 |
| 2) | 25.011 | 0.609 | | |

TABLE 3-continued

| | | | | |
|---|---|---|---|---|
| 3) | 129.688 | 0.700 | 1.592700 | 35.27 |
| 4) | 16.140 | 1.310 | | |
| 5> | ∞ | 2.040 | | (aperture stop) |
| 6) | 19.183 | 2.338 | 1.902650 | 35.72 |
| 7) | −25.424 | 1.418 | 1.808090 | 22.74 |
| 8) | 32.395 | 5.063 | | |
| *9) | −12.503 | 1.000 | 1.806100 | 40.73 |
| 10) | −17.926 | 0.497 | | |
| 11) | −28.256 | 1.408 | 1.583130 | 59.46 |
| *12) | 4346.985 | 2.297 | | |
| *13) | −31.913 | 0.100 | 1.560930 | 36.64 |
| 14) | −32.911 | 6.028 | 1.883000 | 40.66 |
| 15) | −17.733 | Bf | | |

[Aspherical surface data]

| m | K | A4 | A6 | A8 | A10 | A12 | A14 |
|---|---|---|---|---|---|---|---|
| 9) | 1.0000 | −7.29E−04 | 7.45E−06 | −6.12E−07 | 1.55E−08 | −2.59E−10 | |
| 12) | 1.0000 | −4.37E−04 | 5.27E−06 | −6.43E−08 | 5.34E−10 | −2.65E−12 | 6.60E−15 |
| 13) | 1.0000 | 2.25E−05 | −1.82E−07 | 4.68E−10 | | | |

[General specifications]

| | |
|---|---|
| f | 32.82 |
| F. NO | 2.90 |
| y | 21.70 |
| TL | 36.67 |

[Focal length data of groups]

| Groups | Starting surfaces | Focal lengths |
|---|---|---|
| G1 | 1 | 49.49 |
| G2 | 6 | 35.66 |
| G3 | 9 | −25.25 |
| G4 | 13 | 37.26 |

[Back focus]

| | At focusing on infinity | At focusing on a nearby object |
|---|---|---|
| Bf | 9.755 | 17.993 |

Figure 6:
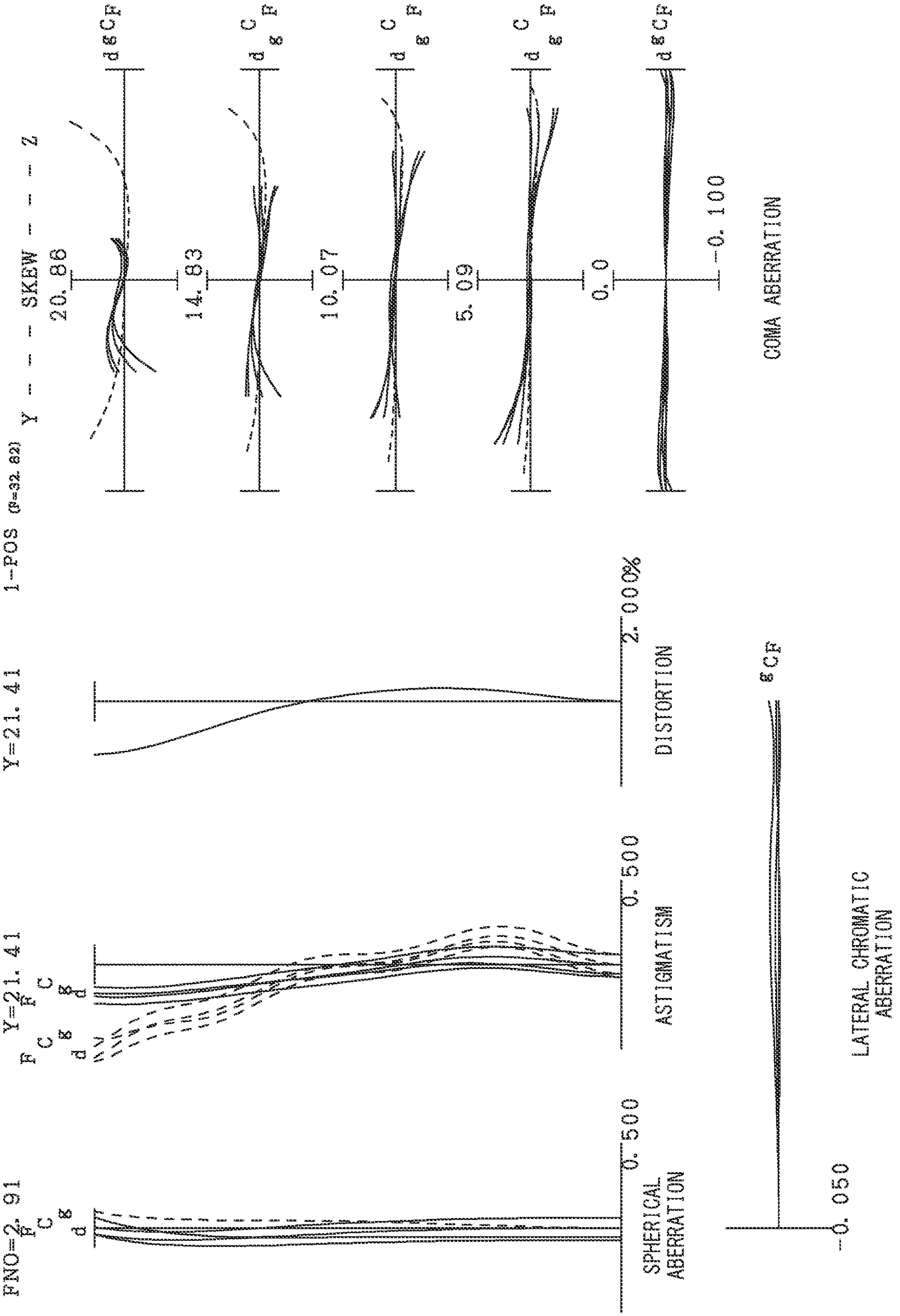
FIG. 6 shows aberrations of the optical system of the third example focusing on an object at infinity.

FIG. 6 shows aberrations of the optical system of the third example focusing on an object at infinity.

The graphs of aberrations suggest that the optical system of the present example effectively reduces variations in aberrations at focusing and at varying magnification, and has high optical performance.

Fourth Example

Figure 7:
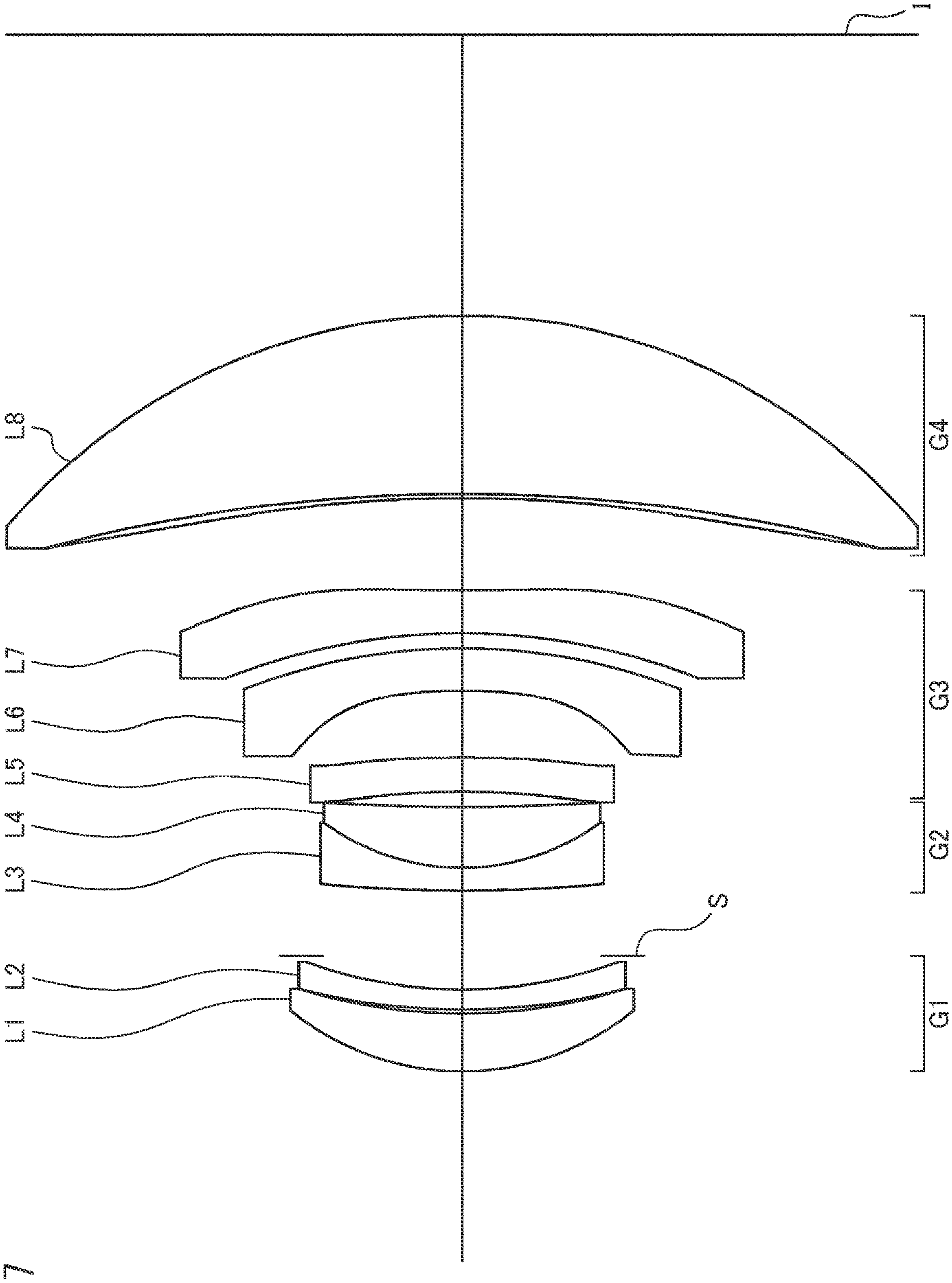
FIG. 7 is a cross-sectional view of an optical system of a fourth example focusing on an object at infinity.

FIG. 7 is a cross-sectional view of an optical system of a fourth example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of, in order from the object side, a positive meniscus lens L1 convex on the object side and a negative meniscus lens L2 convex on the object side.

The second lens group G2 consists of a positive cemented lens composed of, in order from the object side, a negative meniscus lens L3 convex on the object side and a positive meniscus lens L4 convex on the object side.

The third lens group G3 consists of, in order from the object side, a negative meniscus lens L5 concave on the object side, a positive meniscus lens L6 concave on the object side, and a biconcave negative lens L7.

The fourth lens group G4 consists of a positive meniscus lens L8 concave on the object side. The positive meniscus lens L8 is configured by providing a resin layer on the object-side surface of a glass lens body. The positive meniscus lens L8 is a compound-type aspherical lens in which the object-side surface of the resin layer is aspherical. In the [Lens specifications] section below, surface number 15 refers to the object-side surface of the resin layer, surface number 16 to the image-side surface of the resin layer and the object-side surface of the lens body (surfaces where the resin layer and the lens body are bonded together), and surface number 17 to the image-side surface of the lens body.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 4 below shows specifications of the optical system of the present example.

TABLE 4

[Lens specifications]

| m | r | d | nd | vd |
|---|---|---|---|---|
| 1) | 9.625 | 2.028 | 1.795000 | 45.31 |
| 2) | 19.200 | 0.150 | | |
| 3) | 23.181 | 0.700 | 1.846660 | 23.80 |
| 4) | 16.000 | 1.200 | | |
| 5> | ∞ | 2.300 | | (aperture stop) |
| 6) | 51.243 | 0.800 | 1.728250 | 28.38 |
| 7) | 8.210 | 2.148 | 1.883000 | 40.69 |
| 8) | 77.277 | 0.533 | | |
| *9) | −30.000 | 1.200 | 1.531100 | 55.91 |
| *10) | −57.254 | 2.372 | | |
| *11) | −20.625 | 1.500 | 1.806100 | 40.73 |
| 12) | −21.251 | 0.527 | | |
| 13) | −22.642 | 1.500 | 1.583130 | 59.46 |
| *14) | 50.407 | 3.251 | | |
| *15) | −48.588 | 0.150 | 1.560930 | 36.64 |
| 16) | −57.679 | 6.293 | 1.883000 | 40.66 |
| 17) | −21.000 | Bf | | |

[Aspherical surface data]

| m | K | A4 | A6 | A8 | A10 | A12 | A14 |
|---|---|---|---|---|---|---|---|
| 9) | 1.0000 | −2.22E−04 | 1.33E−05 | −3.48E−07 | 1.11E−08 | | |
| 10) | 1.0000 | −4.89E−04 | 1.72E−05 | −4.32E−07 | 1.37E−08 | | |
| 11) | 1.0000 | −9.71E−04 | −5.58E−06 | 5.45E−07 | −3.29E−08 | 5.29E−10 | |
| 14) | 1.0000 | −6.16E−04 | 8.11E−06 | −8.90E−08 | 5.74E−10 | −4.60E−13 | −8.38E−15 |
| 15) | 1.0000 | −6.99E−06 | 1.62E−07 | −3.67E−10 | | | |

[General specifications]

| | |
|---|---|
| f | 32.30 |
| F. NO | 2.91 |
| y | 21.70 |
| TL | 36.54 |

[Focal length data of groups]

| Groups | Starting surfaces | Focal lengths |
|---|---|---|
| G1 | 1 | 31.38 |
| G2 | 6 | 45.42 |
| G3 | 9 | −20.58 |
| G4 | 15 | 36.54 |

[Back focus]

| | At focusing on infinity | At focusing on a nearby object |
|---|---|---|
| Bf | 9.890 | 17.856 |

Figure 8:
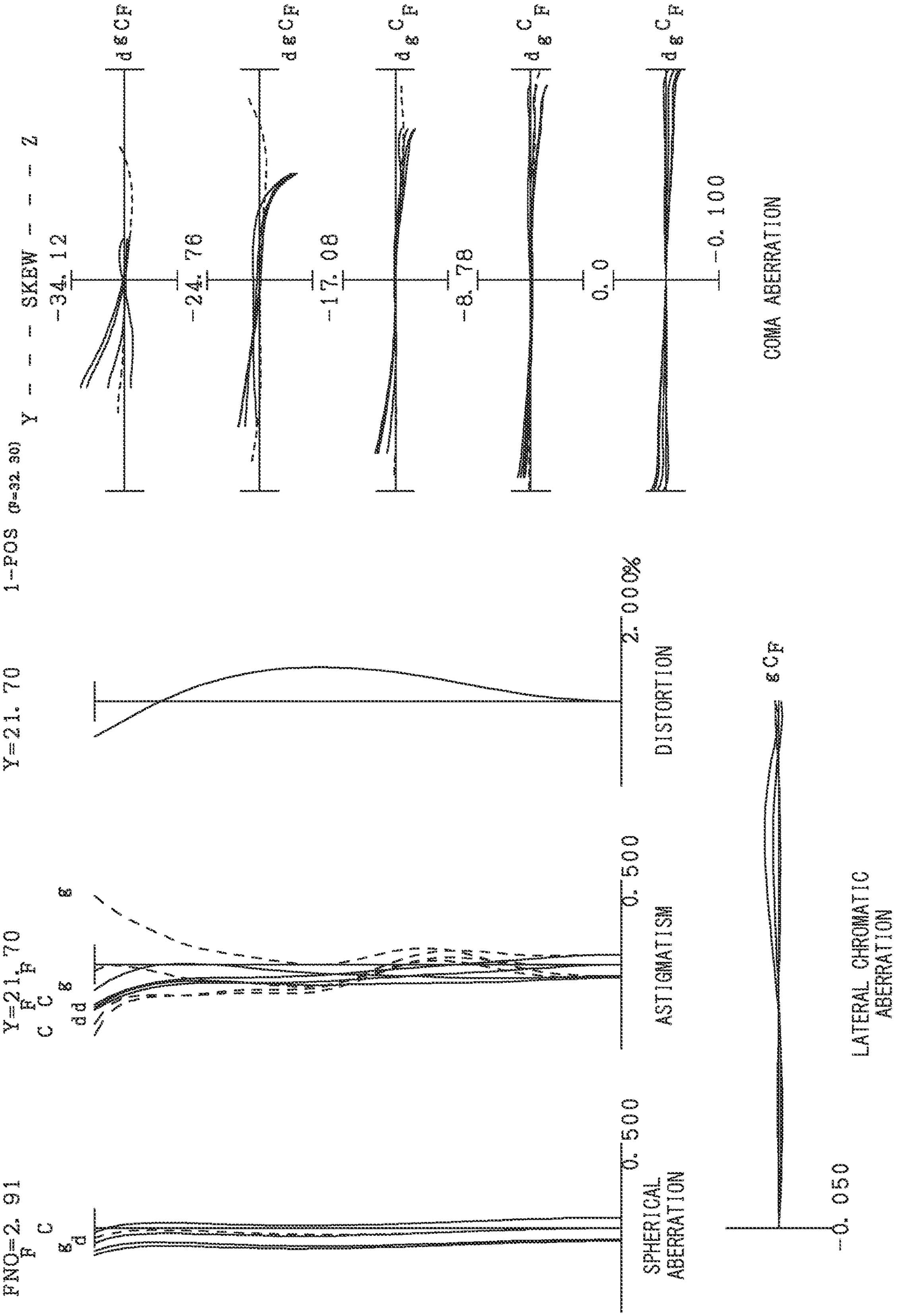
FIG. 8 shows aberrations of the optical system of the fourth example focusing on an object at infinity.

FIG. 8 shows aberrations of the optical system of the fourth example focusing on an object at infinity.

The graphs of aberrations suggest that the optical system of the present example effectively reduces variations in aberrations at focusing and at varying magnification, and has high optical performance.

Fifth Example

Figure 9:
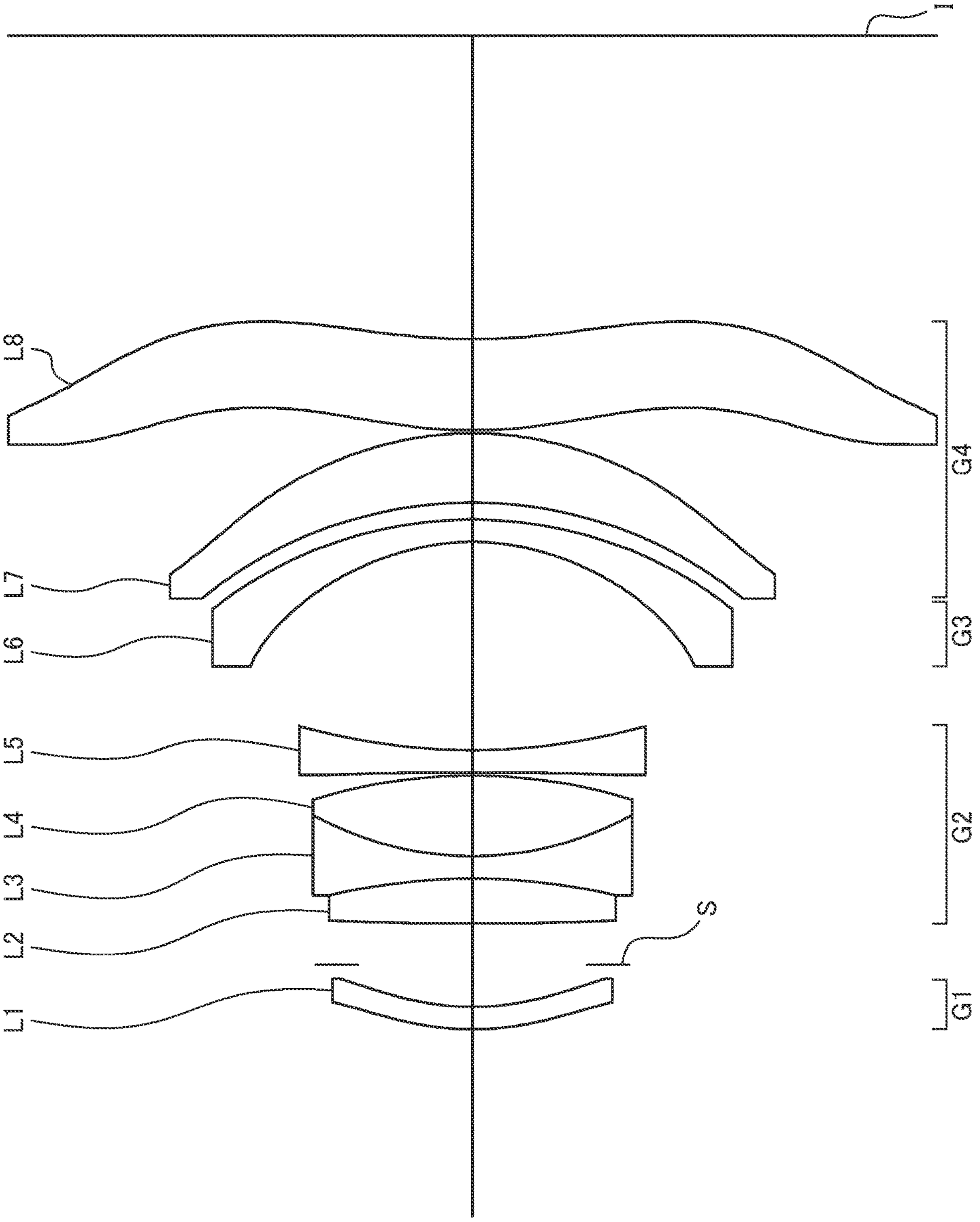
FIG. 9 is a cross-sectional view of an optical system of a fifth example focusing on an object at infinity.

FIG. 9 is a cross-sectional view of an optical system of a fifth example focusing on an object at infinity.

The optical system of the present example includes, in order from the object side, a first lens group G1 having negative refractive power, an aperture stop S, a second lens group G2 having positive refractive power, a third lens group G3 having negative refractive power, and a fourth lens group G4 having positive refractive power.

The first lens group G1 consists of a negative meniscus lens L1 convex on the object side.

The second lens group G2 consists of, in order from the object side, a positive cemented lens composed of a biconvex positive lens L2, a biconcave negative lens L3, and a biconvex positive lens L4 as well as a biconcave negative lens L5.

The third lens group G3 consists of a negative meniscus lens L6 concave on the object side.

The fourth lens group G4 consists of, in order from the object side, a positive meniscus lens L7 concave on the object side and a positive meniscus lens L9 concave on the object side.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 5 below shows specifications of the optical system of the present example.

TABLE 5

[Lens specifications]

| m | r | d | nd | νd |
|---|---|---|---|---|
| *1) | 9.961 | 0.800 | 1.907538 | 35.83 |
| *2) | 9.296 | 1.500 | | |
| 3> | ∞ | 1.500 | | (aperture stop) |
| 4) | 119.597 | 1.605 | 1.883000 | 40.85 |
| 5) | −22.504 | 0.800 | 1.645064 | 32.59 |
| 6) | 11.818 | 2.890 | 1.883000 | 40.85 |
| 7) | −19.300 | 0.100 | | |
| 8) | −180.060 | 0.800 | 1.692516 | 29.41 |
| 9) | 22.694 | 7.460 | | |
| *10) | −8.427 | 0.800 | 1.766263 | 26.08 |
| 11) | −15.131 | 0.609 | | |
| 12) | −15.409 | 2.489 | 1.830348 | 44.65 |
| *13) | −12.034 | 0.100 | | |
| *14) | 16.148 | 3.259 | 1.770292 | 50.81 |
| *15) | 20.624 | Bf | | |

[Aspherical surface data]

| m | K | A4 | A6 | A8 | A10 | A12 | A14 |
|---|---|---|---|---|---|---|---|
| 1) | 1.0000 | −3.50E−04 | −1.03E−05 | | | | |
| 2) | 1.0000 | −3.36E−04 | −1.09E−05 | | | | |
| 10) | 1.0000 | 4.98E−04 | −8.61E−06 | 8.85E−08 | −3.36E−11 | | |
| 13) | 1.0000 | 1.23E−04 | −2.34E−06 | 2.07E−08 | −4.75E−12 | | |
| 14) | 0.4800 | −3.41E−04 | 3.88E−07 | 4.44E−09 | −1.23E−11 | −6.64E−15 | 3.25E−17 |
| 15) | −0.2878 | −2.50E−04 | 2.37E−07 | 4.89E−09 | −3.93E−11 | 1.42E−13 | −1.91E−17 |

[General specifications]

| | |
|---|---|
| f | 24.00 |
| F. NO | 2.87 |
| y | 21.70 |
| TL | 34.52 |

[Focal length data of groups]

| Groups | Starting surfaces | Focal lengths |
|---|---|---|
| G1 | 1 | −358.14 |
| G2 | 4 | 20.14 |
| G3 | 10 | −26.18 |
| G4 | 12 | 27.65 |

[Back focus]

| | At focusing on infinity | At focusing on a nearby object |
|---|---|---|
| Bf | 9.805 | 13.780 |

Figure 10:
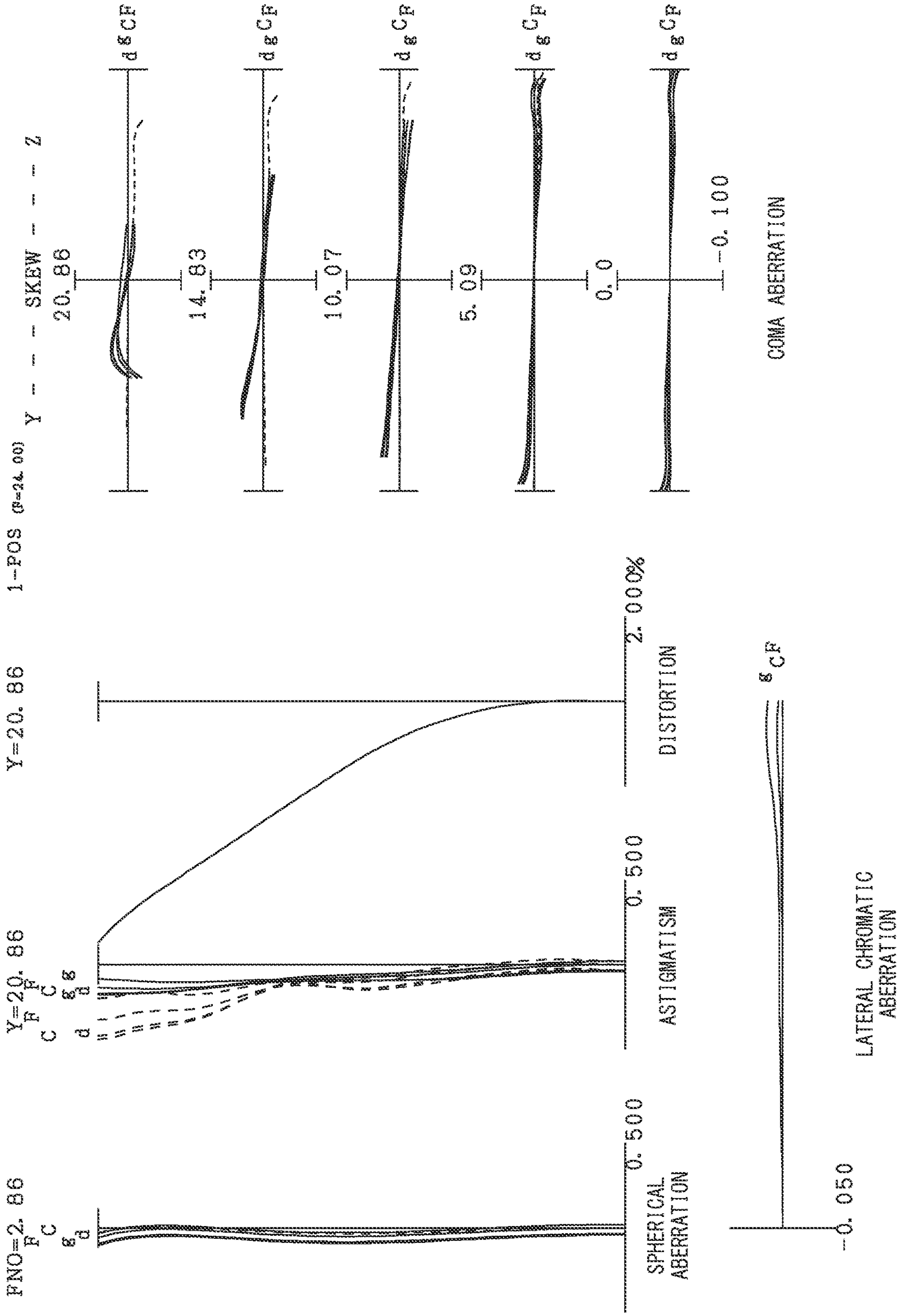
FIG. 10 shows aberrations of the optical system of the fifth example focusing on an object at infinity.

FIG. 10 shows aberrations of the optical system of the fifth example focusing on an object at infinity.

The graphs of aberrations suggest that the optical system of the present example effectively reduces variations in aberrations at focusing and at varying magnification, and has high optical performance.

Sixth Example

Figure 11:
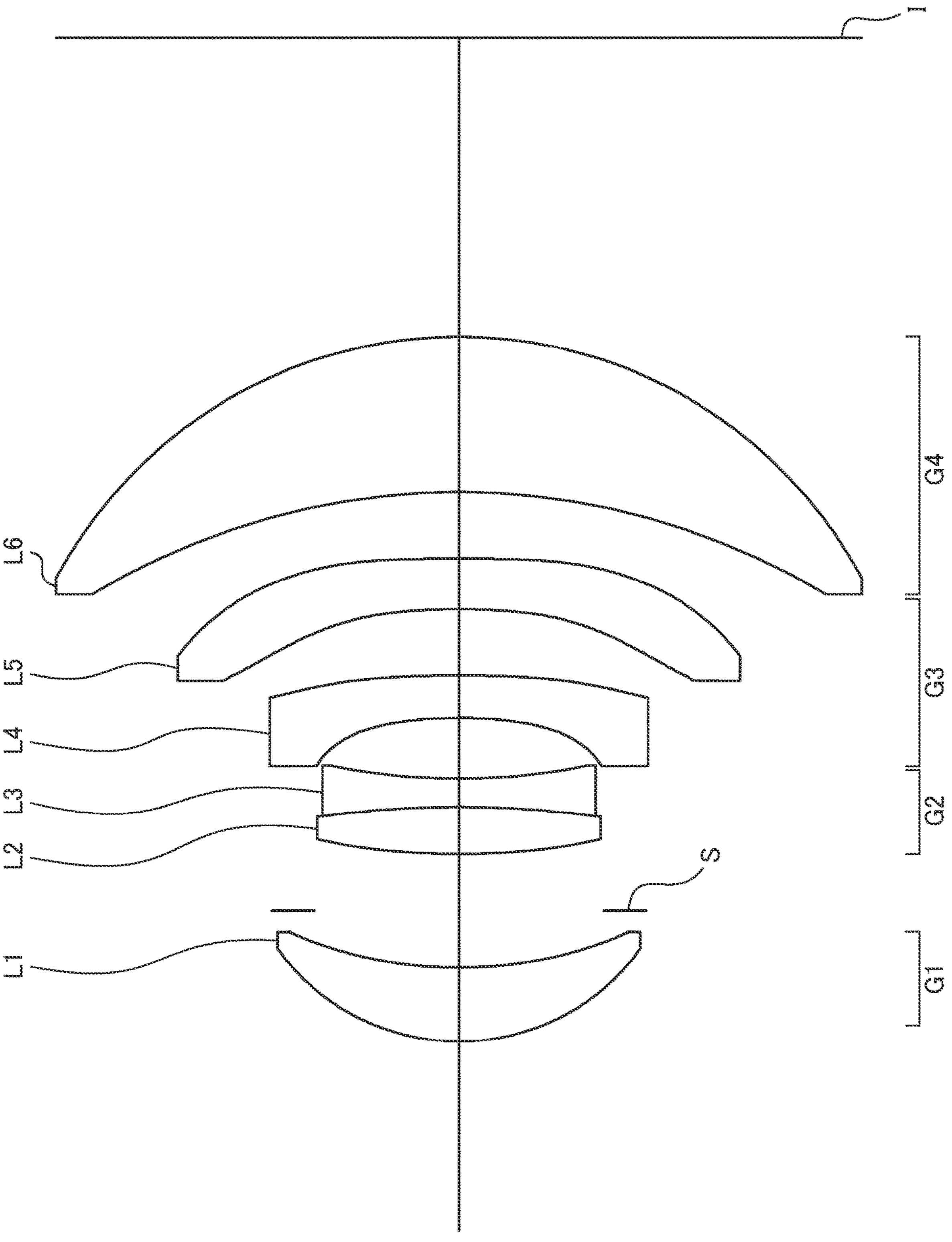
FIG. 11 is a cross-sectional view of an optical system of a sixth example focusing on an object at infinity.

FIG. 11 is a cross-sectional view of an optical system of a sixth example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of a positive meniscus lens L1 convex on the object side.

The second lens group G2 consists of a positive cemented lens composed of, in order from the object side, a biconvex positive lens L2 and a biconcave negative lens L3.

The third lens group G3 consists of, in order from the object side, a negative meniscus lens L4 concave on the object side and a negative meniscus lens L5 concave on the object side.

The fourth lens group G4 consists of a positive meniscus lens L6 concave on the object side.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 6 below shows specifications of the optical system of the present example.

TABLE 6

[Lens specifications]

| m | r | d | nd | νd |
|---|---|---|---|---|
| *1) | 7.944 | 2.623 | 1.589130 | 61.25 |
| *2) | 16.000 | 2.000 | | |
| 3> | ∞ | 2.000 | | (aperture stop) |
| 4) | 24.561 | 1.675 | 1.883000 | 40.69 |
| 5) | −35.492 | 1.000 | 1.796788 | 25.20 |
| 6) | 22.141 | 2.145 | | |
| *7) | −17.784 | 1.500 | 1.805180 | 25.45 |
| *8) | −57.197 | 2.337 | | |
| *9) | −28.238 | 1.800 | 1.583130 | 59.46 |
| *10) | −138.813 | 2.357 | | |
| 11) | −25.000 | 5.493 | 2.001000 | 29.12 |
| 12) | −16.161 | Bf | | |

[Aspherical surface data]

| m | K | A4 | A6 | A8 | A10 |
|---|---|---|---|---|---|
| 1) | 1.0000 | 1.28E−06 | 4.10E−07 | −5.88E−09 | 1.99E−10 |
| 2) | 1.0000 | 5.07E−05 | 4.59E−07 | 2.20E−09 | −1.16E−10 |
| 7) | 1.0000 | −8.32E−04 | −1.16E−05 | 5.73E−07 | −4.44E−08 |
| 8) | 1.0000 | −4.65E−04 | 1.10E−05 | −2.13E−07 | 2.29E−09 |
| 9) | 1.0000 | −7.58E−04 | 7.80E−06 | 4.75E−09 | −1.99E−10 |
| 10) | 1.0000 | −5.51E−04 | 5.45E−06 | −3.96E−08 | 8.82E−11 |

[General specifications]

| | |
|---|---|
| f | 34.01 |
| F. NO | 2.91 |
| y | 21.70 |
| TL | 35.50 |

[Focal length data of groups]

| Groups | Starting surfaces | Focal lengths |
|---|---|---|
| G1 | 1 | 23.89 |
| G2 | 4 | 236.16 |
| G3 | 7 | −20.55 |
| G4 | 11 | 34.83 |

[Back focus]

| | At focusing on infinity | At focusing on a nearby object |
|---|---|---|
| Bf | 10.569 | 15.615 |

Figure 12:
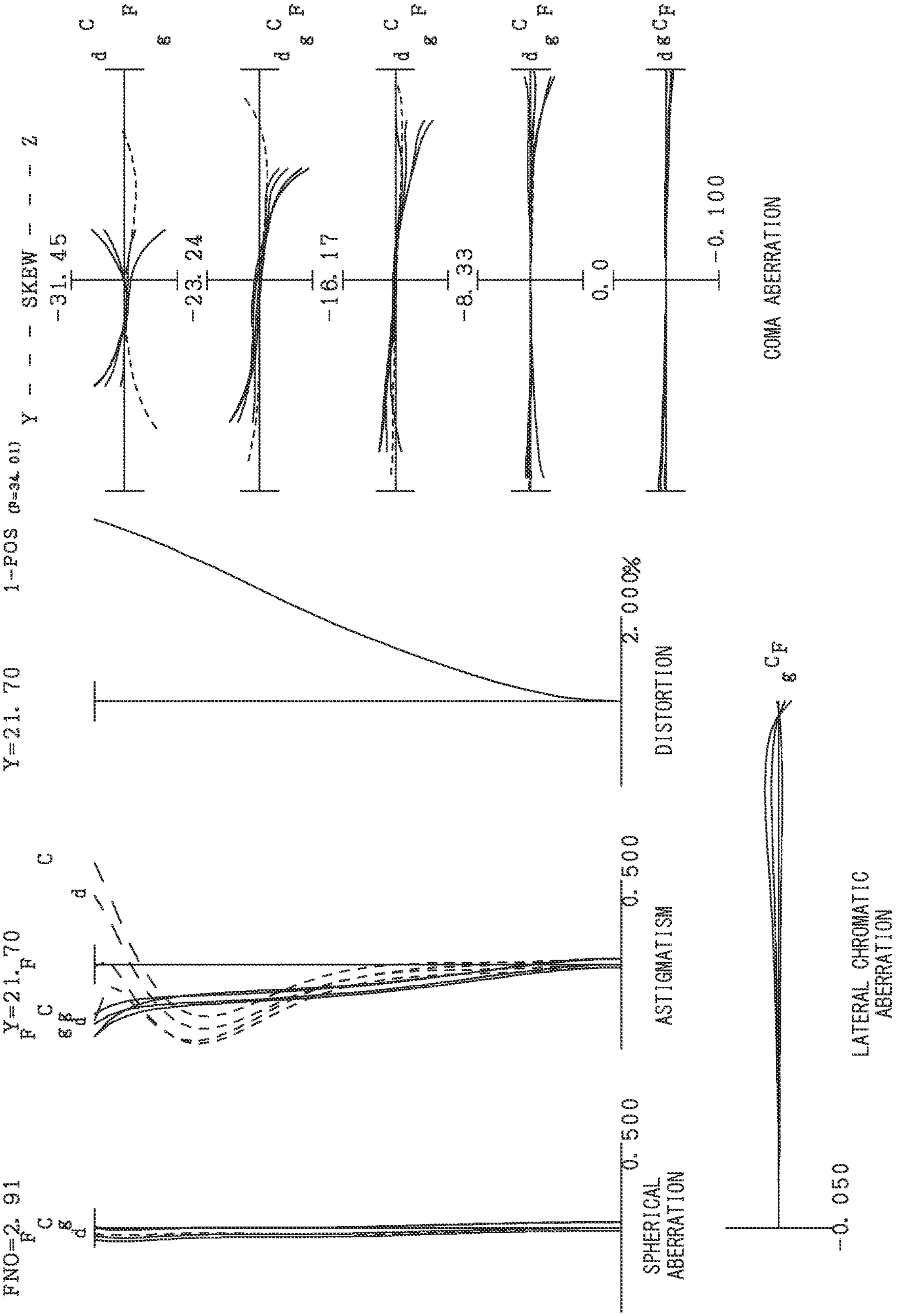
FIG. 12 shows aberrations of the optical system of the sixth example focusing on an object at infinity.

FIG. 12 shows aberrations of the optical system of the sixth example focusing on an object at infinity.

The graphs of aberrations suggest that the optical system of the present example effectively reduces variations in aberrations at focusing and at varying magnification, and has high optical performance.

Seventh Example

Figure 13:
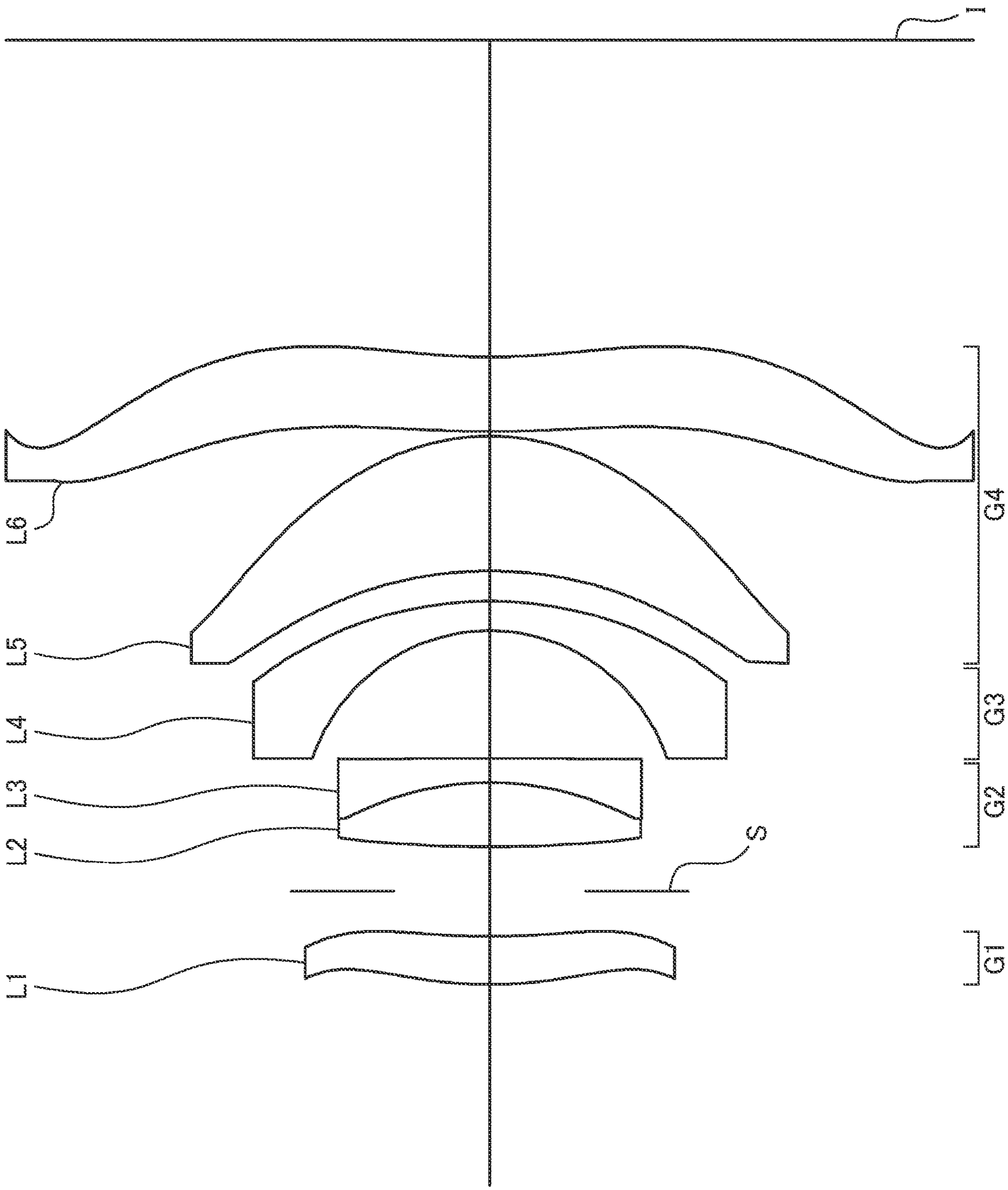
FIG. 13 is a cross-sectional view of an optical system of a seventh example focusing on an object at infinity.

FIG. 13 is a cross-sectional view of an optical system of a seventh example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of a positive meniscus lens L1 convex on the object side.

The second lens group G2 consists of a positive cemented lens composed of, in order from the object side, a biconvex positive lens L2 and a negative meniscus lens L3 concave on the object side.

The third lens group G3 consists of a negative meniscus lens L4 concave on the object side.

The fourth lens group G4 consists of a positive meniscus lens L5 concave on the object side and a negative meniscus lens L6 concave on the object side.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 7 below shows specifications of the optical system of the present example.

TABLE 7

[Lens specifications]

| m | r | d | nd | νd |
|---|---|---|---|---|
| *1) | 13.372 | 1.607 | 1.758455 | 46.62 |
| *2) | 23.028 | 1.500 | | |
| 3> | ∞ | 1.500 | | (aperture stop) |
| 4) | 42.852 | 2.140 | 1.883000 | 40.80 |
| 5) | −10.251 | 0.800 | 1.736478 | 27.48 |
| 6) | −437.299 | 4.254 | | |
| 7) | −6.216 | 1.000 | 1.790528 | 25.41 |
| 8) | −12.772 | 1.000 | | |
| *9) | −13.816 | 4.488 | 1.883000 | 40.80 |
| *10) | −7.854 | 0.150 | | |
| *11) | 33.599 | 2.500 | 1.805180 | 25.45 |
| *12) | 20.269 | Bf | | |

[Aspherical surface data]

| m | K | A4 | A6 | A8 | A10 |
|---|---|---|---|---|---|
| 1) | 1.8136 | −4.45E−04 | −9.70E−06 | −3.04E−07 | 5.12E−09 |
| 2) | 4.1053 | −5.42E−04 | −1.60E−05 | 1.03E−07 | 2.19E−09 |
| 9) | 0.1844 | −2.07E−04 | 3.82E−06 | −5.05E−08 | 3.60E−10 |
| 10) | 0.4645 | 6.44E−06 | 1.48E−06 | −2.08E−08 | 2.44E−10 |
| 11) | −66.3322 | −2.24E−04 | 8.83E−07 | −9.05E−10 | 1.14E−12 |
| 12) | −18.9774 | −2.99E−04 | 1.51E−06 | −5.96E−09 | 1.31E−11 |

[General specifications]

| | |
|---|---|
| f | 22.01 |
| F. NO | 3.21 |
| y | 21.70 |
| TL | 31.51 |

[Focal length data of groups]

| Groups | Starting surfaces | Focal lengths |
|---|---|---|
| G1 | 1 | 39.02 |
| G2 | 4 | 27.62 |
| G3 | 7 | −16.28 |
| G4 | 9 | 18.84 |

[Back focus]

| | At focusing on infinity | At focusing on a nearby object |
|---|---|---|
| Bf | 10.569 | 13.712 |

Figure 14:
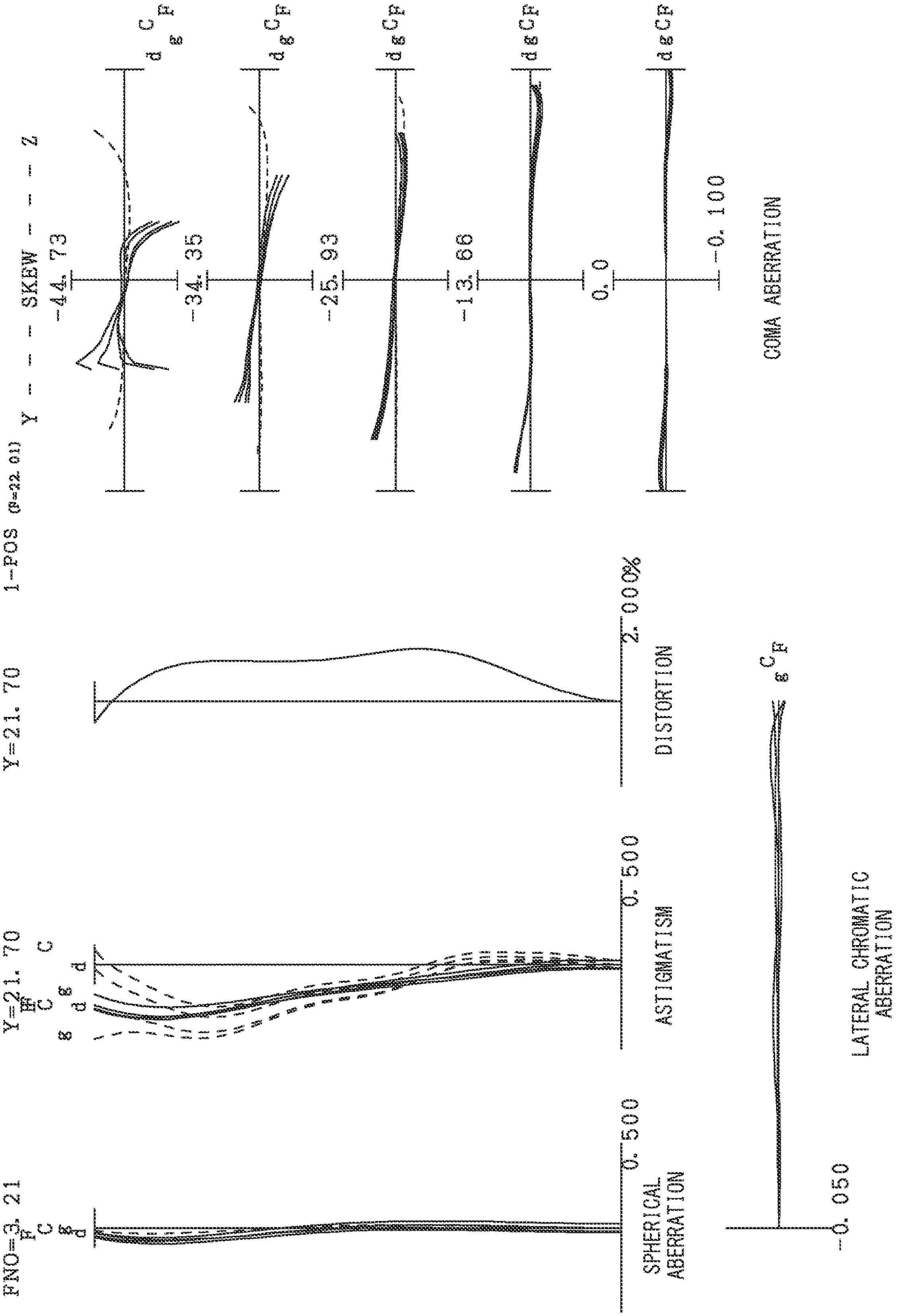
FIG. 14 shows aberrations of the optical system of the seventh example focusing on an object at infinity.

FIG. 14 shows aberrations of the optical system of the seventh example focusing on an object at infinity.

The graphs of aberrations suggest that the optical system of the present example effectively reduces variations in aberrations at focusing and at varying magnification, and has high optical performance.

Eighth Example

Figure 15:
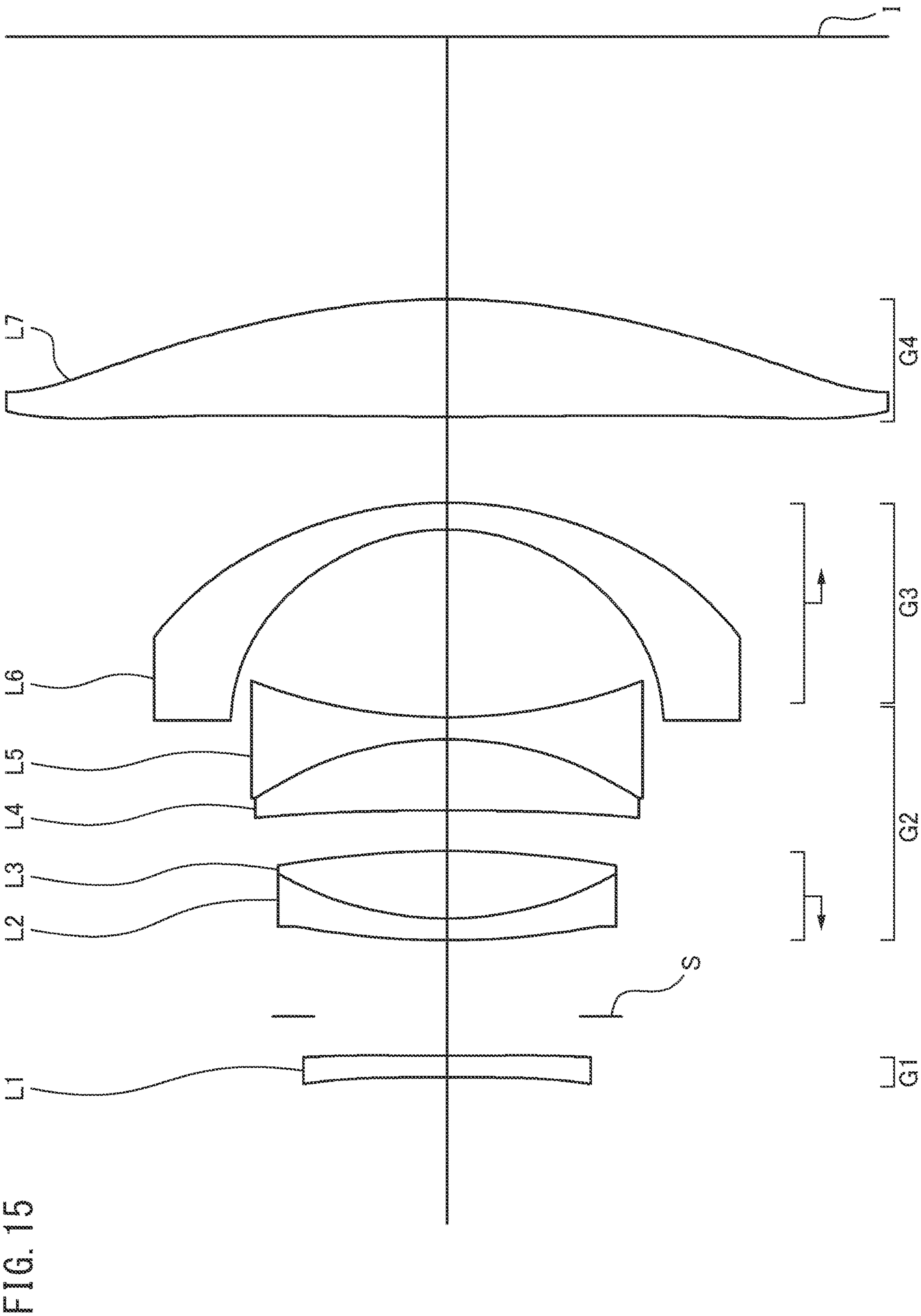
FIG. 15 is a cross-sectional view of an optical system of an eighth example focusing on an object at infinity.

FIG. 15 is a cross-sectional view of an optical system of an eighth example focusing on an object at infinity.

The optical system of the present example includes, in order from the object side, a first lens group G1 having negative refractive power, an aperture stop S, a second lens group G2 having positive refractive power, a third lens group G3 having negative refractive power, and a fourth lens group G4 having positive refractive power.

The first lens group G1 consists of a negative meniscus lens L1 convex on the object side.

The second lens group G2 consists of, in order from the object side, a positive cemented lens composed of a negative meniscus lens L2 convex on the object side and a biconvex positive lens L3 as well as a negative cemented lens composed of a positive meniscus lens L4 concave on the object side and a biconcave negative lens 5.

The third lens group G3 consists of a negative meniscus lens L6 concave on the object side.

The fourth lens group G4 consists of a biconvex positive lens L7.

An imaging device (not shown) constructed from CCD, CMOS, or the like is disposed on an image plane I.

When focus is shifted from infinity to a nearby object, the optical system of the present example moves a lens component having positive refractive power and a lens component having negative refractive power in opposite directions along the optical axis. More specifically, the optical system of the present example focuses by moving the positive cemented lens in the second lens group G2, which is composed of the negative meniscus lens L2 convex on the object side and the biconvex positive lens L3, and the third lens group G3 along the optical axis. When focus is shifted from infinity to a nearby object, the positive cemented lens in the second lens group G2, which is composed of the negative meniscus lens L2 convex on the object side and the biconvex positive lens L3, moves from the image-plane side toward the object side. When focus is shifted from infinity to a nearby object, the third lens group G3 moves from the object side toward the image-plane side. Each lens component is a single lens or a cemented lens.

In the optical system of the present example, the second lens group G2 and the third and fourth lens groups correspond to the rear group.

Table 8 below shows specifications of the optical system of the present example.

TABLE 8

[Lens specifications]

| m | r | d | nd | νd |
|---|---|---|---|---|
| *1) | 282.805 | 0.800 | 1.805180 | 25.45 |
| *2) | 78.200 | 1.475 | | |
| 3> | ∞ | 2.835 | | (aperture stop) |
| 4) | 31.646 | 0.800 | 1.771153 | 22.75 |
| 5) | 12.706 | 2.500 | 1.880000 | 41.00 |
| 6) | −36.634 | 1.500 | | |
| *7) | −122.908 | 2.658 | 1.999000 | 30.00 |
| 8) | −12.544 | 0.800 | 1.563351 | 33.16 |
| 9) | 19.973 | 6.979 | | |
| *10) | −8.037 | 1.000 | 1.957878 | 24.00 |
| *11) | −14.963 | 3.180 | | |
| *12) | 326.624 | 4.372 | 1.851080 | 40.12 |
| *13) | −25.361 | Bf | | |

TABLE 8-continued

[Aspherical surface data]

| m | K | A4 | A6 | A8 | A10 |
|---|---|---|---|---|---|
| 1) | −1.0000 | −5.55E−04 | 7.68E−06 | −2.71E−08 | 1.50E−10 |
| 2) | −1.0000 | −5.12E−04 | 9.58E−06 | −7.18E−08 | 6.94E−10 |
| 7) | 1.0000 | −3.07E−05 | −4.38E−08 | 2.01E−09 | |
| 10) | 1.0000 | 6.56E−05 | 1.07E−06 | 2.24E−09 | |
| 11) | 1.0000 | −3.07E−05 | 6.15E−07 | −4.67E−09 | |
| 12) | 1.0000 | −1.43E−05 | −2.52E−08 | 2.56E−10 | |
| 13) | 1.0000 | 5.98E−05 | −2.99E−07 | 7.75E−10 | |

[General specifications]

| | |
|---|---|
| f | 27.70 |
| F. NO | 2.90 |
| y | 21.70 |
| TL | 38.45 |
| Bf | 9.555 |

[Focal length data of groups]

| Groups | Starting surfaces | Focal lengths |
|---|---|---|
| G1 | 1 | −134.48 |
| G2 | 4 | 18.23 |
| G3 | 10 | −19.50 |
| G4 | 12 | 27.81 |

[Back focus]

| | At focusing on infinity | At focusing on a nearby object |
|---|---|---|
| D3 | 2.835 | 1.045 |
| D6 | 1.500 | 3.290 |
| D9 | 6.979 | 8.414 |
| D11 | 3.180 | 1.746 |

Figure 16:
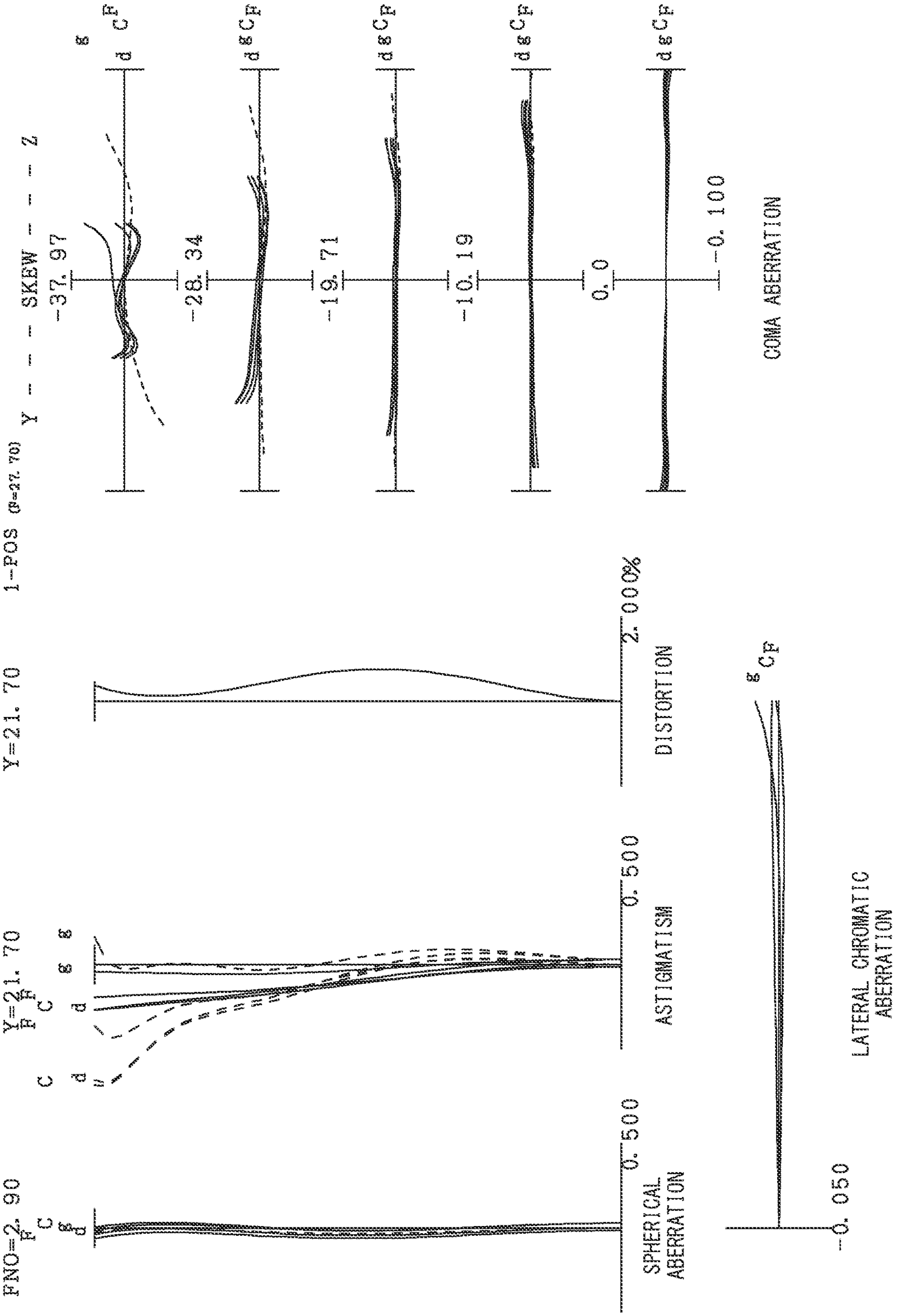
FIG. 16 shows aberrations of the optical system of the eighth example focusing on an object at infinity.

FIG. 16 shows aberrations of the optical system of the eighth example focusing on an object at infinity.

The graphs of aberrations suggest that the optical system of the present example effectively reduces variations in aberrations at focusing and at varying magnification, and has high optical performance.

Ninth Example

Figure 17:
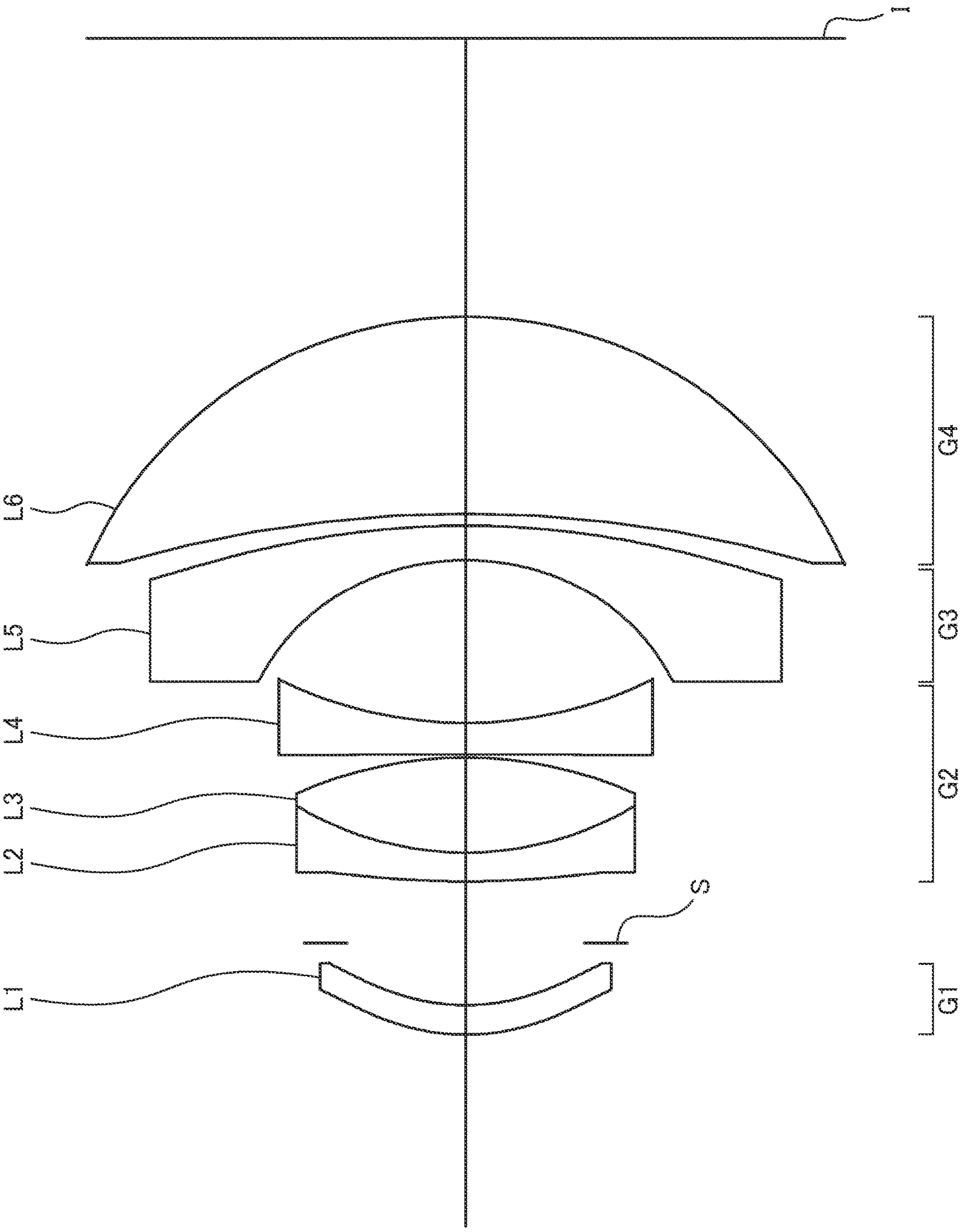
FIG. 17 is a cross-sectional view of an optical system of a ninth example focusing on an object at infinity.

FIG. 17 is a cross-sectional view of an optical system of a ninth example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of a positive meniscus lens L1 convex on the object side.

The second lens group G2 consists of, in order from the object side, a positive cemented lens composed of a negative meniscus lens L2 convex on the object side and a biconvex positive lens L3 as well as a biconcave negative lens L4.

The third lens group G3 consists of a negative meniscus lens L5 concave on the object side.

The fourth lens group G4 consists of a positive meniscus lens L6 concave on the object side.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 9 below shows specifications of the optical system of the present example.

TABLE 9

[Lens specifications]

| m | r | d | nd | νd |
|---|---|---|---|---|
| *1) | 7.518 | 1.030 | 1.883000 | 40.66 |
| *2) | 7.356 | 2.155 | | |
| 3> | ∞ | 2.147 | | (aperture stop) |
| *4) | 31.360 | 1.001 | 1.805180 | 25.45 |
| 5) | 11.317 | 3.334 | 1.883000 | 40.66 |
| 6) | −14.425 | 0.100 | | |
| 7) | −728.550 | 1.100 | 1.592701 | 35.31 |
| 8) | 14.706 | 5.680 | | |
| *9) | −8.942 | 1.200 | 1.803010 | 25.53 |
| *10) | −30.665 | 0.424 | | |
| 11) | −43.153 | 6.874 | 1.904001 | 35.62 |
| 12) | −14.408 | Bf | | |

[Aspherical surface data]

| m | K | A4 | A6 | A8 | A10 | A12 |
|---|---|---|---|---|---|---|
| 1) | 1.0000 | −2.33E−04 | −4.52E−06 | −4.85E−07 | 4.20E−09 | |
| 2) | 1.0000 | −2.00E−04 | −2.96E−06 | −9.34E−07 | 1.59E−08 | |
| 4) | 1.0000 | −1.08E−04 | 8.43E−07 | −1.86E−08 | | |
| 9) | 1.0000 | −1.02E−04 | 7.24E−07 | −7.06E−08 | 1.32E−09 | −1.97E−11 |
| 10) | 1.0000 | 6.29E−06 | −1.79E−08 | 4.65E−10 | | |

[General specifications]

| | |
|---|---|
| f | 25.18 |
| F. NO | 2.90 |
| y | 20.39 |
| TL | 34.74 |

[Focal length data of groups]

| Groups | Starting surfaces | Focal lengths |
|---|---|---|
| G1 | 1 | 194.76 |
| G2 | 4 | 18.54 |
| G3 | 9 | −16.12 |
| G4 | 11 | 21.49 |

[Back focus]

| | At focusing on infinity | At focusing on a nearby object |
|---|---|---|
| Bf | 9.697 | 13.9880 |

Figure 18:
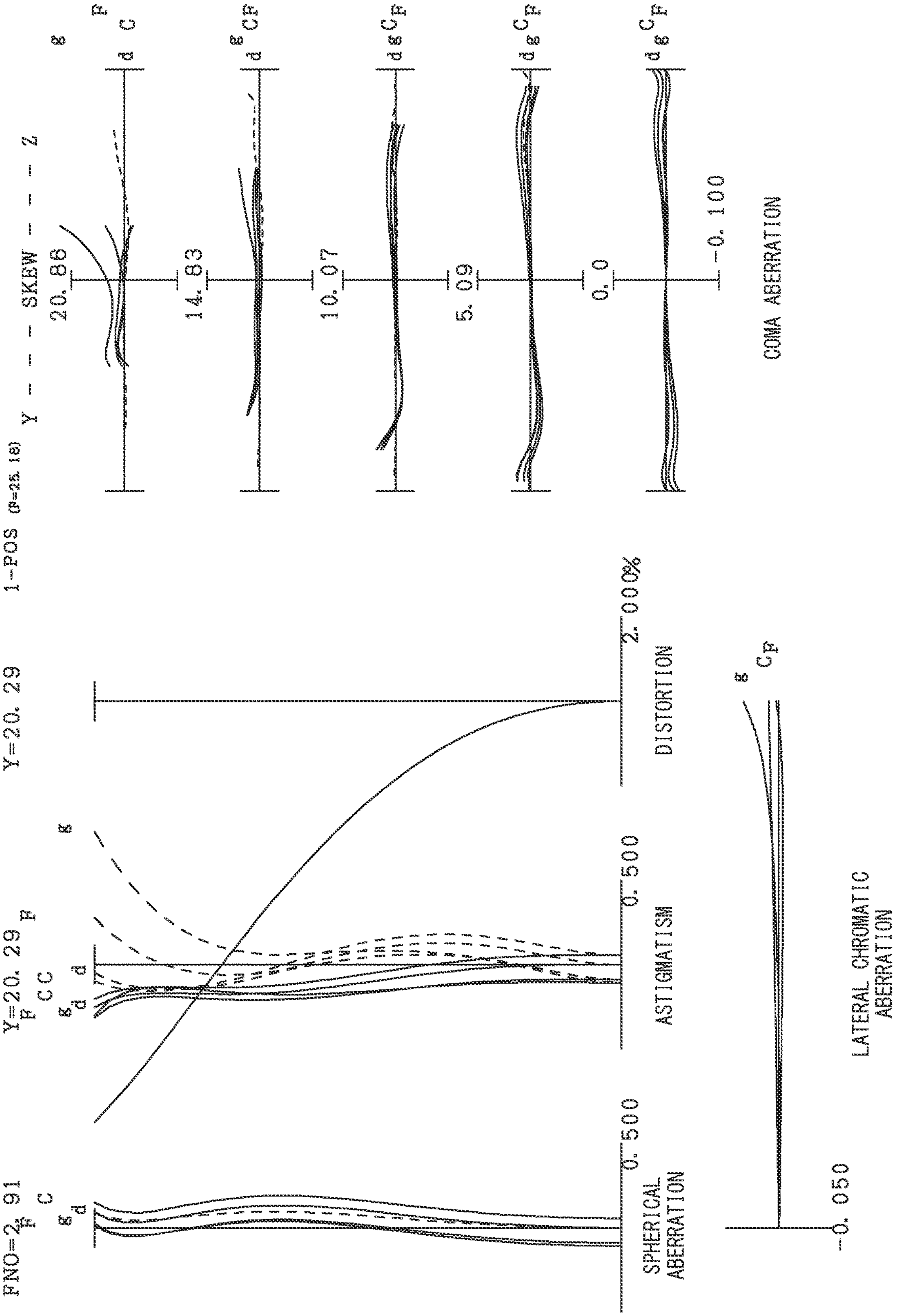
FIG. 18 shows aberrations of the optical system of the ninth example focusing on an object at infinity.

FIG. 18 shows aberrations of the optical system of the ninth example focusing on an object at infinity.

The graphs of aberrations suggest that the optical system of the present example effectively reduces variations in aberrations at focusing and at varying magnification and has high optical performance.

Tenth Example

Figure 19:
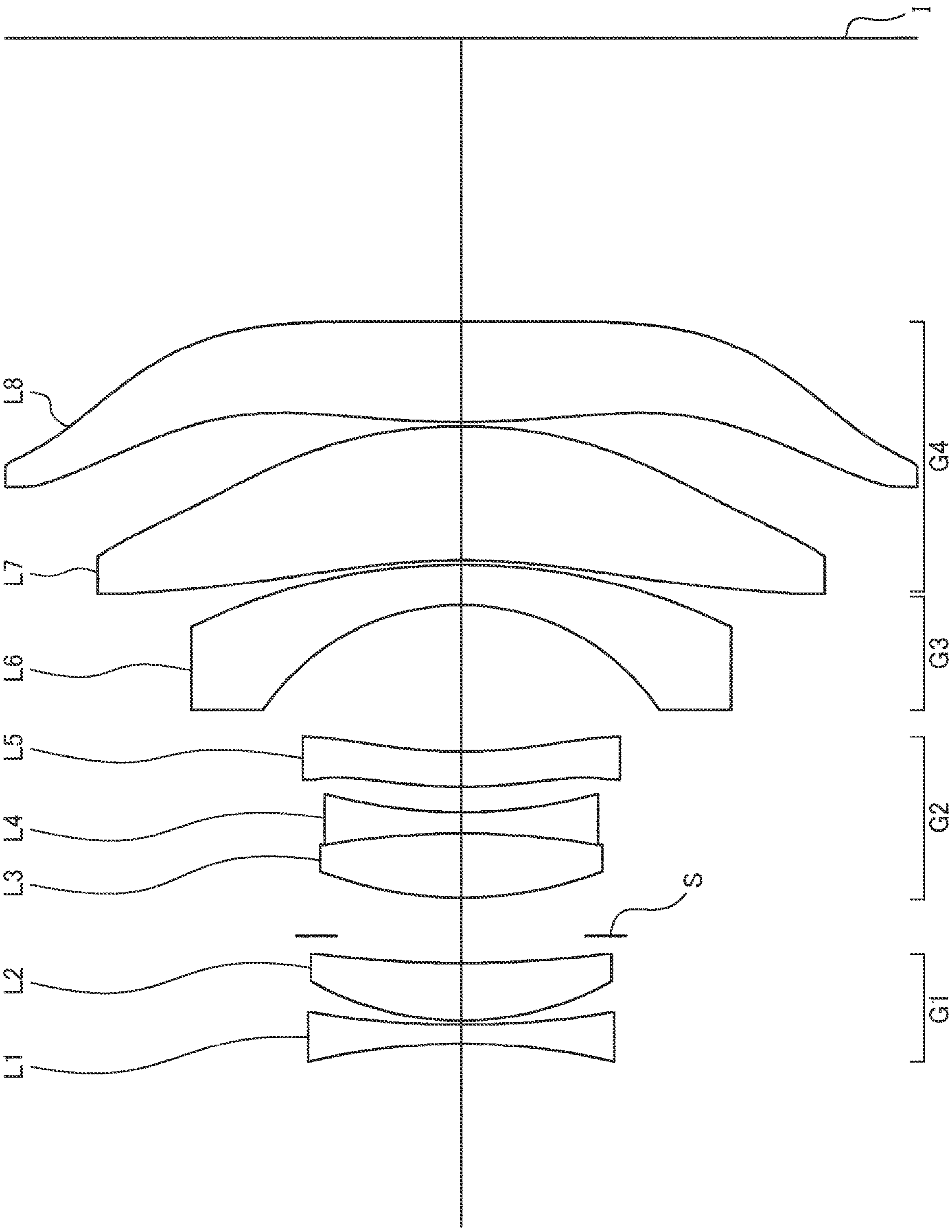
FIG. 19 is a cross-sectional view of an optical system of a tenth example focusing on an object at infinity.

FIG. 19 is a cross-sectional view of an optical system of a tenth example focusing on an object at infinity.

The optical system of the present example includes, in order from the object side, a first lens group G1 having positive refractive power, an aperture stop S, a second lens group G2 having positive refractive power, a third lens group G3 having negative refractive power, and a fourth lens group G4 having positive refractive power.

The first lens group G1 consists of, in order from the object side, a biconcave negative lens L1 and a positive meniscus lens L2 convex on the object side.

The second lens group G2 consists of, in order from the object side, a positive cemented lens composed of a biconvex positive lens L3 and a biconcave negative lens L4 as well as a positive meniscus lens L5 convex on the object side.

The third lens group G3 consists of a negative meniscus lens L6 concave on the object side.

The fourth lens group G4 consists of, in order from the object side, a positive meniscus lens L7 convex on the image side and a positive meniscus lens L8 convex on the object side.

An imaging device (not shown) constructed from CCD, CMOS, or the like is disposed on an image plane I.

The optical system of the present example focuses by moving the entire optical system along the optical axis. When focus is shifted from infinity to a nearby object, the optical system of the present example moves from the image-plane side toward the object side.

In the optical system of the present example, the second lens group G2 and the third and fourth lens groups correspond to the rear group.

Table 10 below shows specifications of the optical system of the present example.

TABLE 10

[Lens specifications]

| m | r | d | nd | νd |
|---|---|---|---|---|
| 1) | −23.449 | 0.700 | 1.613598 | 36.82 |
| 2) | 33.857 | 0.150 | | |
| 3) | 11.280 | 2.105 | 1.883000 | 40.80 |
| 4) | 40.749 | 1.000 | | |
| 5> | ∞ | 1.400 | | (aperture stop) |
| 6) | 14.422 | 2.347 | 1.883000 | 40.80 |
| 7) | −30.826 | 0.800 | 1.747300 | 27.01 |
| 8) | 19.013 | 0.925 | | |
| *9) | 18.064 | 1.290 | 1.960467 | 32.03 |
| *10) | 18.119 | 5.372 | | |
| 11) | −8.800 | 1.500 | 1.799952 | 25.10 |
| 12) | −22.414 | 0.150 | | |
| *13) | −25.091 | 4.911 | 1.883000 | 40.80 |
| *14) | −18.000 | 0.150 | | |
| *15) | 32.314 | 3.700 | 1.851080 | 40.12 |
| *16) | 17745.601 | Bf | | |

[Aspherical surface data]

| m | K | A4 | A6 | A8 | A10 | A12 | A14 |
|---|---|---|---|---|---|---|---|
| 9) | 1.0000 | −3.35E−04 | −1.23E−05 | 1.33E−07 | −3.68E−09 | | |
| 10) | 1.0000 | −1.14E−04 | −1.16E−05 | 1.55E−07 | −7.48E−10 | | |
| 13) | 1.0000 | 1.31E−04 | −2.94E−07 | | | | |
| 14) | 1.0000 | −1.07E−04 | 8.42E−07 | 8.79E−09 | −8.07E−11 | 1.69E−13 | |
| 15) | 3.0000 | −1.86E−04 | −1.20E−07 | −1.55E−09 | 5.19E−11 | −2.50E−13 | 3.71E−16 |
| 16) | 3.0000 | 1.73E−05 | −2.34E−06 | 2.02E−08 | −1.03E−10 | 3.08E−13 | −3.78E−16 |

[General specifications]

| | |
|---|---|
| f | 26.21 |
| F. NO | 2.92 |
| y | 21.70 |
| TL | 36.47 |

[Focal length data of groups]

| Groups | Starting surfaces | Focal lengths |
|---|---|---|
| G1 | 1 | 71.50 |
| G2 | 6 | 30.34 |
| G3 | 11 | −19.04 |
| G4 | 13 | 21.28 |

[Back focus]

| | At focusing on infinity | At focusing on a nearby object |
|---|---|---|
| Bf | 9.969 | 17.856 |

Figure 20:
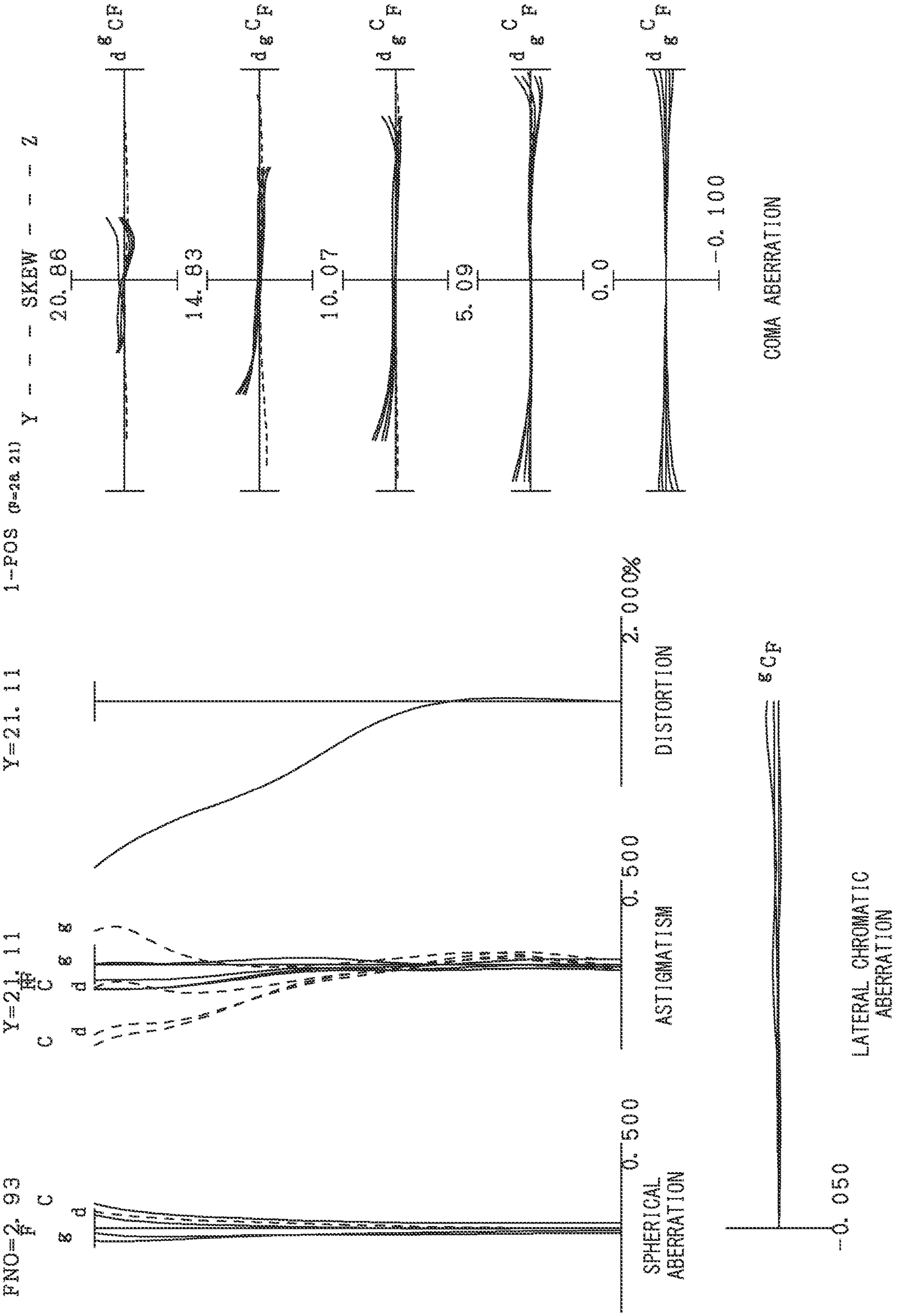
FIG. 20 shows aberrations of the optical system of the tenth example focusing on an object at infinity.

FIG. 20 shows aberrations of the optical system of the tenth example focusing on an object at infinity.

The graphs of aberrations suggest that the optical system of the present example effectively reduces variations in aberrations at focusing and at varying magnification, and has high optical performance.

An optical system of favorable optical performance can be achieved according to the above examples.

Values for the conditional expressions of the examples are listed below.

Bf is a back focus in air-equivalent length, y is a maximum image height, and TL is the distance from a lens surface closest to the object side to an image plane at focusing on an object at infinity. f, f1, f2, f3, and f4 are the focal lengths of the entire optical system, the first lens group, the second lens group, the third lens group, and the fourth lens group, respectively. ΣD is the distance from the lens surface closest to the object side to a lens surface closest to the image-plane side, and ΣD1 is the distance from the lens surface closest to the object side to the stop. TLs is the distance from the stop to the image plane, and D1 is the distance from a lens surface closest to the object side in the first lens group to a lens surface closest to the image-plane side in the first lens group. s3 is the shape factor of the lens closest to the object side in the third lens group, and d3 is the distance from the stop to a lens surface closest to the object side in the third lens group.

[Values for Conditional Expressions]

| Examples | 1st | 2nd | 3rd | 4th | 5th | 6th | 7th | 8th | 9th | 10th |
|---|---|---|---|---|---|---|---|---|---|---|
| (1) Bf/y: | 0.445 | 0.450 | 0.450 | 0.456 | 0.452 | 0.487 | 0.487 | 0.440 | 0.476 | 0.459 |
| (2) TL/y: | 1.680 | 1.690 | 1.690 | 1.684 | 1.591 | 1.636 | 1.452 | 1.772 | 1.704 | 1.681 |
| (3) \|f3/f\|: | 0.927 | 0.854 | 0.769 | 0.637 | 1.091 | 0.604 | 0.740 | 0.704 | 0.640 | 0.727 |
| (4) f4/f: | 1.084 | 1.305 | 1.135 | 1.131 | 1.152 | 1.024 | 0.856 | 1.004 | 0.853 | 0.812 |
| (5) \|f3/f4\|: | 0.852 | 0.654 | 0.678 | 0.563 | 0.947 | 0.590 | 0.864 | 0.701 | 0.750 | 0.895 |
| (6) ΣD/TL: | 0.735 | 0.734 | 0.734 | 0.729 | 0.716 | 0.702 | 0.665 | 0.752 | 0.721 | 0.727 |
| (7) ΣD1/TL: | 0.093 | 0.126 | 0.129 | 0.112 | 0.067 | 0.130 | 0.099 | 0.059 | 0.092 | 0.108 |
| (8) TL/f: | 1.416 | 1.117 | 1.117 | 1.131 | 1.438 | 1.044 | 1.431 | 1.388 | 1.379 | 1.391 |
| (9) TLs/TL: | 0.907 | 0.874 | 0.871 | 0.888 | 0.933 | 0.870 | 0.901 | 0.941 | 0.908 | 0.892 |
| (10) f1/f: | 2.605 | 1.329 | 1.508 | 0.971 | — | 0.703 | 1.773 | — | — | 2.728 |
| (11) f2/f: | 0.998 | 1.190 | 1.086 | 1.406 | 0.839 | — | 1.255 | 0.658 | 0.736 | 1.158 |
| (12) D1/TL: | 0.071 | 0.092 | 0.093 | 0.079 | 0.023 | 0.074 | 0.051 | 0.021 | 0.030 | 0.081 |
| (13) s3: | 2.951 | 5.884 | 5.611 | 3.202 | 3.514 | 1.902 | 2.896 | 3.321 | 1.823 | 2.293 |
| (14) d3/f: | 0.604 | 0.330 | 0.331 | 0.179 | 0.631 | 0.201 | 0.395 | 0.652 | 0.531 | 0.463 |

The above examples are specific examples of the present invention, and the present invention is not limited thereto. The following details can be appropriately employed unless the optical performance of the optical system of the embodiment of the present application is compromised.

The lens surfaces of the lenses constituting any of the optical systems of the above examples may be covered with antireflection coating having high transmittance in a wide wavelength range. This reduces flares and ghosts, and enables achieving optical performance with high contrast.

Next, a camera including the optical system of the present embodiment will be described with reference to FIG. 21.

Figure 21:
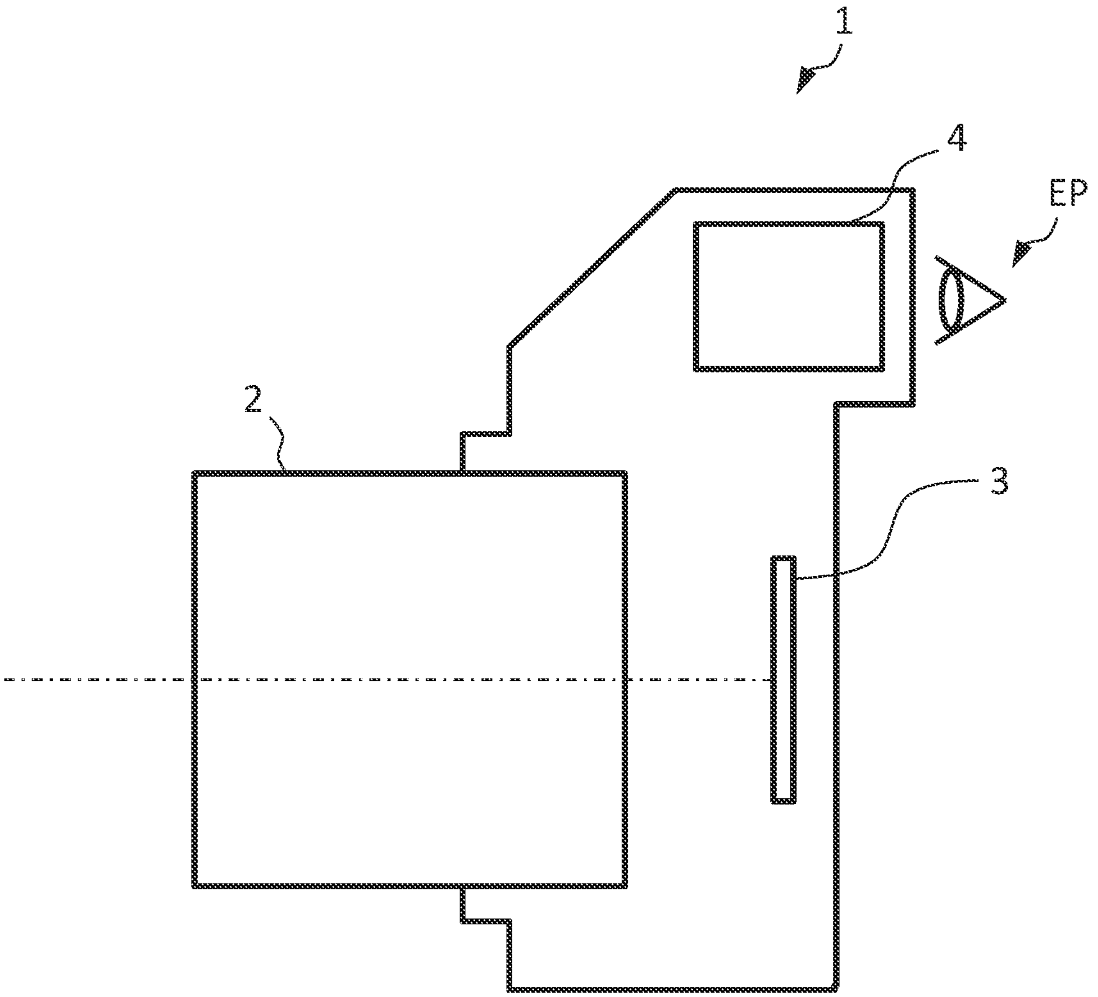
FIG. 21 schematically shows a camera including an optical system of the embodiment.

FIG. 21 schematically shows a camera including the optical system of the present embodiment.

The camera 1 is a "mirror-less camera" of an interchangeable lens type including the optical system according to the first example as an imaging lens 2.

In the camera 1, light from an object (subject) (not shown) is condensed by the imaging lens 2 and reaches an imaging device 3. The imaging device 3 converts the light from the subject to image data. The image data is displayed on an electronic view finder 4. This enables a photographer who positions his/her eye at an eye point EP to observe the subject.

When a release button (not shown) is pressed by the photographer, the image data is stored in a memory (not shown). In this way, the photographer can take a picture of the subject with the camera 1.

The optical system of the first example included in the camera 1 as the imaging lens 2 is an optical system of favorable optical performance. Thus the camera 1 can achieve favorable optical performance. A camera configured by including any of the optical systems of the second to tenth examples as the imaging lens 2 can have the same effect as the camera 1.

Figure 22:
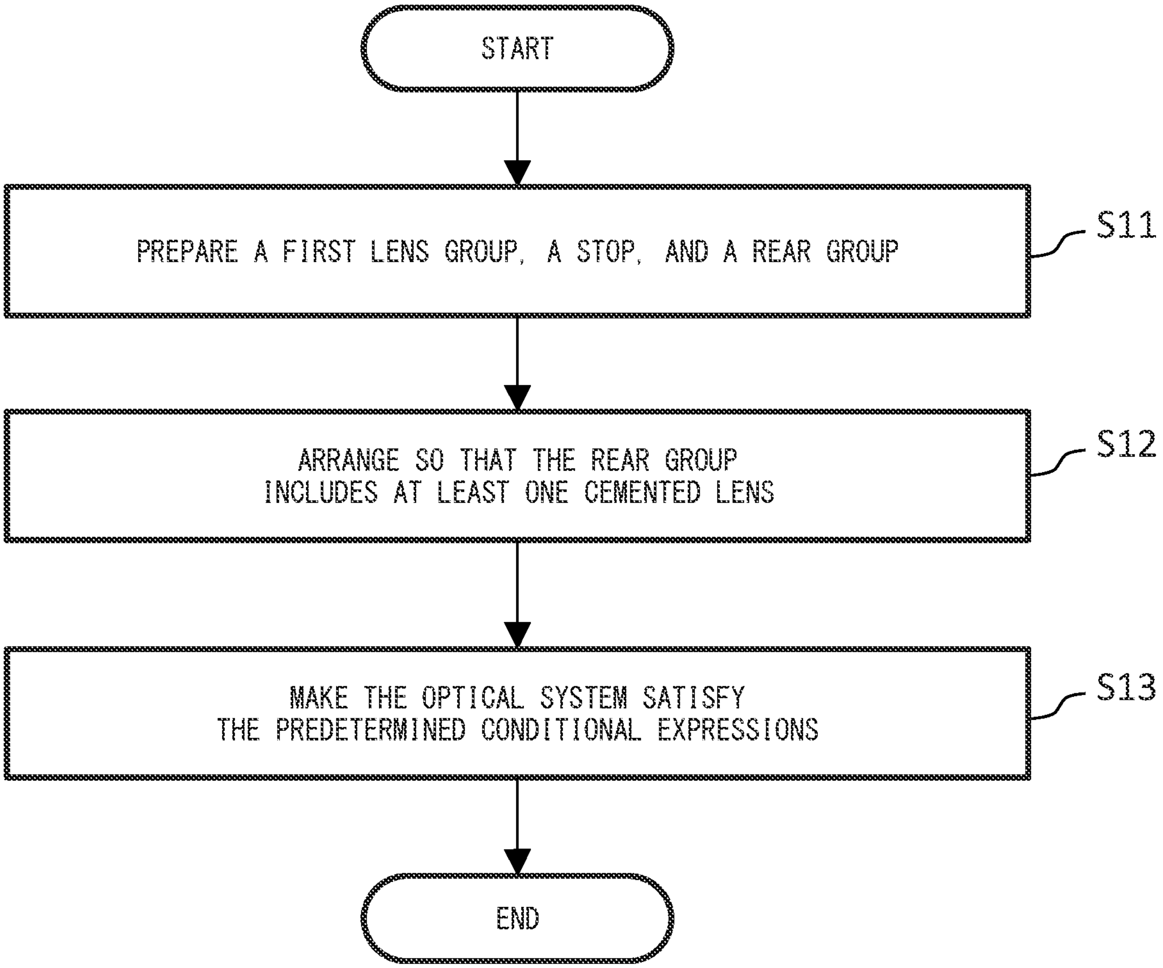
FIG. 22 is a flowchart outlining a first method for manufacturing an optical system of the embodiment.
Figure 23:
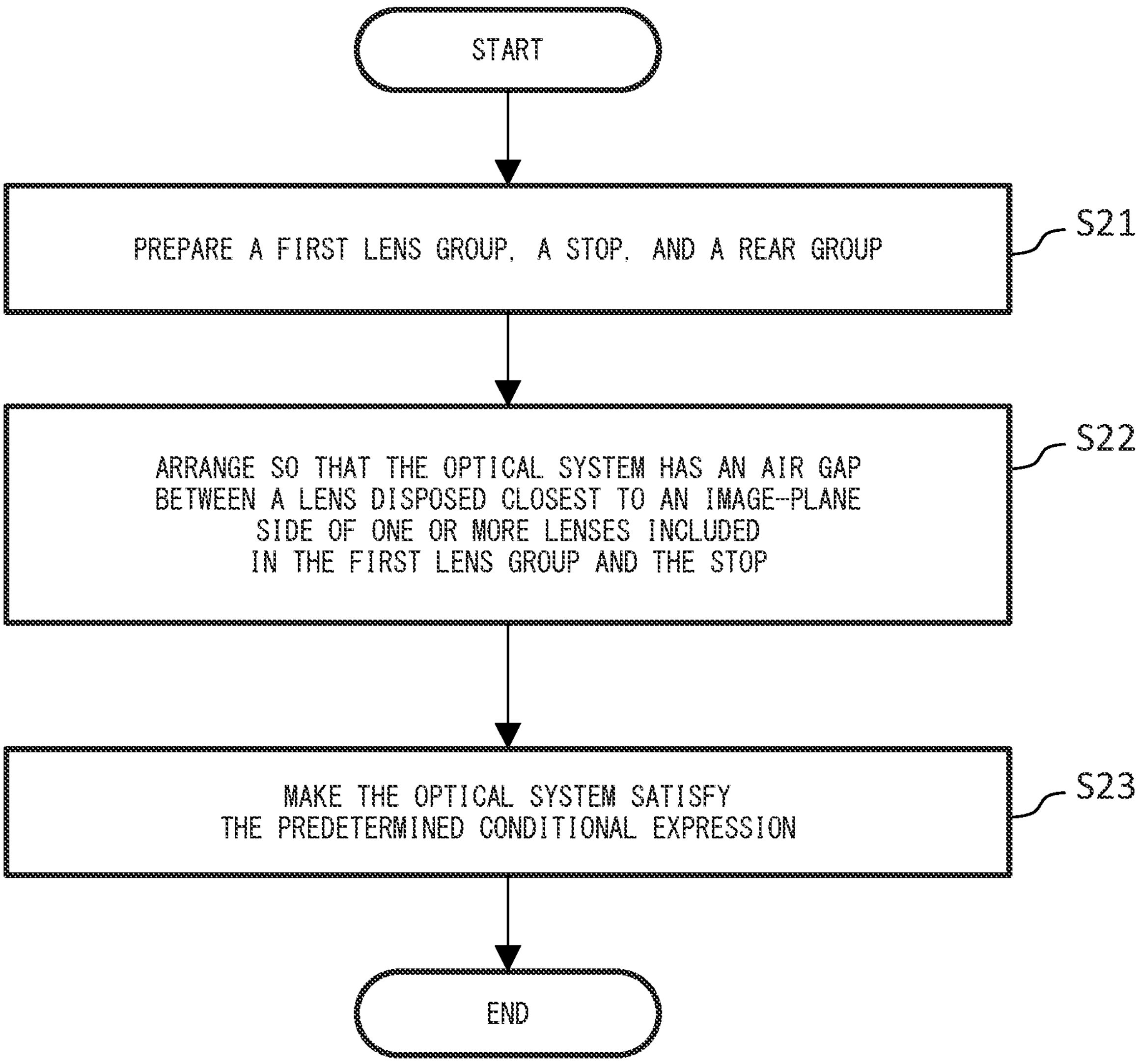
FIG. 23 is a flowchart outlining a second method for manufacturing an optical system of the embodiment.

Finally, a method for manufacturing an optical system of the present embodiment will be outlined with reference to FIGS. 22 and 23. FIG. 22 is a flowchart outlining a first method for manufacturing an optical system of the present embodiment. FIG. 23 is a flowchart outlining a second method for manufacturing an optical system of the present embodiment.

The first method for manufacturing an optical system of the present embodiment shown in FIG. 22 includes the following steps S1 to S13:

Step S11: preparing a first lens group, a stop, and a rear group;

Step S12: arranging so that the rear group includes at least one cemented lens; and Step S13: making the optical system satisfy all of the following conditional expressions:

$$0.35 < Bf/y < 0.70 \quad (1)$$

$$1.35 < TL/y < 1.85 \quad (2)$$

where

Bf is a back focus in air-equivalent length, y is a maximum image height, and

TL is the distance from a lens surface closest to the object side to an image plane at focusing on an object at infinity.

The second method for manufacturing an optical system of the present embodiment shown in FIG. 23 includes the following steps S21 to S23:

Step S21: preparing a first lens group, a stop, and a rear group;

Step S22: arranging so that the optical system has an air gap between a lens disposed closest to an image-plane side of one or more lenses included in the first lens group and the stop; and Step S23: making the optical system satisfy the following conditional expression:

$$1.35 < TL/y < 1.85 \quad (2)$$

where

TL is the distance from a lens surface closest to the object side to an image plane at focusing on an object at infinity, and y is a maximum image height.

An optical system of favorable imaging performance can be manufactured by these methods for manufacturing an optical system of the present embodiment.

Four-group configurations have been illustrated as examples of the optical system of the present embodiment. However, the present embodiment is not limited to the four-group configurations, and a different group configuration (e.g., a five-group configuration) may be employed. More specifically, the optical system of the present embodiment may be configured by adding a lens or an optical member to the object side or the image-plane side of the optical system of one of the examples.

The optical system of the present embodiment may include a vibration reduction lens group configured to make a movement including a component in a direction perpendicular to the optical axis to correct an image blur caused by hand-held camera shake. The vibration reduction lens group may be a lens group or a sub-lens group consisting of at least one lens component included in a lens group.

At focusing, the entire optical system, or one of the lens groups, multiple lens groups, or a sub-lens group in the optical system of the present embodiment may move in the direction of the optical axis. For example, when focus is shifted from an object at infinity to a nearby object, a lens group disposed closer to the object side than the stop and a lens group disposed closer to the image-plane side than the stop may move toward the object side by different amounts.

In the optical system of the present embodiment, lens surfaces may be spherical, plane, or aspherical surfaces. Spherical or plane lens surfaces are preferable, because they facilitate lens machining, assembling, and adjustment and prevent a decrease in optical performance caused by errors in machining, assembling, and adjustment. Further, spherical or plane lens surfaces are preferable, because depiction performance does not decrease much when the image plane is shifted.

An aspherical lens surface may be formed by grinding glass or glass molding with a mold having an aspherical shape, or formed on the surface of resin bonded on a glass surface. In the optical system of the present embodiment, lens surfaces may be diffractive surfaces, and lenses may be graded index lenses (GRIN lenses) or plastic lenses.

In the optical system of the present embodiment, the aperture stop is preferably disposed between the first and second lens groups. However, for example, a lens frame may be used as a substitute, without including a separate member serving as the aperture stop.

It should be noted that those skilled in the art can make various changes, substitutions, and modifications without departing from the spirit and scope of the present invention.

REFERENCE SIGNS LIST

S aperture stop
I image plane
1 camera
2 imaging lens
3 imaging device

The invention claimed is:

1. An optical system comprising, in order from an object side, a first lens group, a stop, and a rear group, the rear group comprising at least one cemented lens, wherein the rear group comprises, in order from the object side, a second lens group, a third lens group having negative refractive power, and a fourth lens group, the third lens group comprises a negative meniscus lens concave on the object side that is closest to the object side in the third lens group, the fourth lens group consists of two positive lenses, a single positive lens and a single negative lens, or a single positive lens, and all of the following conditional expressions being satisfied:

$$0.35 < Bf/y < 0.70$$

$$1.35 < TL/y < 1.85$$

$$0.45 < f4/f < 1.70$$

where

Bf is a back focus in air-equivalent length, y is a maximum image height,

TL is a distance from a lens surface closest to the object side to an image plane at focusing on an object at infinity, f4 is a focal length of the fourth lens group, and f is a focal length of the entire optical system.

2. The optical system according to claim 1, wherein the lens closest to the object side in the third lens group is a negative meniscus lens that is disposed closer to an image-plane side than the stop.

3. The optical system according to claim 1, wherein the following conditional expression is satisfied:

$$0.30 < |f3/f| < 1.60$$

where f3 is a focal length of the third lens group, and f is the focal length of the entire optical system.

4. The optical system according to claim 1, wherein the following conditional expression is satisfied:

$$0.25 < |f3/f4| < 2.00$$

where f3 is a focal length of the third lens group, and f4 is the focal length of the fourth lens group.

5. The optical system according to claim 1, wherein the following conditional expression is satisfied:

$$0.50 < \sum D/TL < 0.97$$

where

ΣD is a distance from the lens surface closest to the object side to a lens surface closest to an image-plane side.

6. The optical system according to claim 1, wherein the following conditional expression is satisfied:

$$0.05 < \sum D1/TL < 0.17$$

where

ΣD1 is a distance from the lens surface closest to the object side to the stop.

7. The optical system according to claim 1, wherein the following conditional expression is satisfied:

$$0.75 < TL/f < 1.60$$

where f is the focal length of the entire optical system.

8. The optical system according to claim 1, wherein the following expression is satisfied:

$$0.62 < TLs/TL < 1.00$$

where

TLs is a distance from the stop to the image plane.

9. The optical system according to claim 1, wherein the following conditional expression is satisfied:

$$0.70 < f1/f < 5.00$$

where f1 is a focal length of the first lens group, and f is the focal length of the entire optical system.

10. The optical system according to claim 1, wherein the following conditional expression is satisfied:

$$0.30 < f2/f < 2.00$$

where f2 is a focal length of the second lens group, and f is the focal length of the entire optical system.

11. The optical system according to claim 1, wherein the first lens group comprises one or two lenses.

12. The optical system according to claim 1, wherein the following conditional expression is satisfied:

$$0.01 < D1/TL < 0.15$$

where

D1 is a distance from a lens surface closest to the object side in the first lens group to a lens surface closest to an image-plane side in the first lens group.

13. The optical system according to claim 1, wherein the following conditional expression is satisfied:

$$1.50 < s3 < 7.00$$

where s3 is a shape factor of the lens closest to the object side in the third lens group.

14. The optical system according to claim 1, wherein the following conditional expression is satisfied:

$$0.15 < d3/f < 0.75$$

where d3 is a distance from the stop to a lens surface closest to the object side in the third lens group, and f is the focal length of the entire optical system.

15. The optical system according to claim 1, being composed of six to nine lenses.

16. The optical system according to claim 1, wherein an object-side lens surface of the lens disposed closest to the object side has positive refractive power.

17. The optical system according to claim 1, wherein an image-plane side lens surface of a lens disposed closest to the image-plane side has negative refractive power.

18. The optical system according to claim 1, wherein the second lens group comprises a cemented lens that is closest to the object side in the second lens group.

19. An optical apparatus comprising the optical system according to claim 1.

20. A method for manufacturing an optical system comprising, in order from an object side, a first lens group, a stop, and a rear group, the method comprising arranging so that:

the rear group comprises at least one cemented lens, the rear group comprises, in order from the object side, a second lens group, a third lens group having negative refractive power, and a fourth lens group, the third lens group comprises a negative meniscus lens concave on the object side that is closest to the object side in the third lens group, the fourth lens group consists of two positive lenses, a single positive lens and a single negative lens, or a single positive lens, and all of the following conditional expressions are satisfied:

$$0.35 < Bf/y < 0.70$$

$$1.35 < TL/y < 1.85$$

$$0.45 < f4/f < 1.70$$

where

Bf is a back focus in air-equivalent length, y is a maximum image height,

TL is a distance from a lens surface closest to the object side to an image plane at focusing on an object at infinity, f4 is a focal length of the fourth lens group, and f is a focal length of the entire optical system.

* * * * *